United States Patent
Liu et al.

(10) Patent No.: US 11,159,731 B2
(45) Date of Patent: Oct. 26, 2021

(54) SYSTEM AND METHOD FOR AI ENHANCED SHUTTER BUTTON USER INTERFACE

(71) Applicant: Samsung Electronics Co., Ltd., Suwon-si (KR)

(72) Inventors: David Liu, Plano, TX (US); Youngjun Yoo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/279,724

(22) Filed: Feb. 19, 2019

(65) Prior Publication Data

US 2020/0267324 A1 Aug. 20, 2020

(51) Int. Cl.
*H04N 5/232* (2006.01)

(52) U.S. Cl.
CPC ... *H04N 5/232933* (2018.08); *H04N 5/23219* (2013.01)

(58) Field of Classification Search
CPC .......... H04N 5/23219; H04N 5/23248; H04N 5/23251; H04N 5/23254; H04N 5/23258; H04N 5/232933; H04N 5/23293; H04N 5/232939; H04N 5/23206; H04N 5/23225
See application file for complete search history.

(56) References Cited

U.S. PATENT DOCUMENTS

| | | | |
|---|---|---|---|
| 9,001,253 B2 | 4/2015 | Maeda | |
| 9,113,072 B2 | 8/2015 | Kinoshita | |
| 9,547,392 B2 | 1/2017 | Yoon et al. | |
| 9,871,962 B2 | 1/2018 | Stricker | |
| 10,747,411 B2* | 8/2020 | Smith | H04N 5/23293 |
| 2005/0212911 A1* | 9/2005 | Marvit | H04N 21/422 |
| | | | 348/154 |
| 2009/0150545 A1 | 6/2009 | Flores et al. | |
| 2009/0239579 A1 | 9/2009 | Lee et al. | |

(Continued)

FOREIGN PATENT DOCUMENTS

| | | |
|---|---|---|
| CN | 104536664 A | 4/2015 |
| JP | 2014-82765 A | 5/2014 |

(Continued)

OTHER PUBLICATIONS

International Search Report and Written Opinion of the International Searching Authority in connection with International Patent Application No. PCT/KR2020/002364 dated Jun. 15, 2020, 8 pages.

*Primary Examiner* — Albert H Cutler

(57) ABSTRACT

An electronic device, a method, and computer readable medium for operating an electronic device are disclosed. The method includes receiving data about a state of the electronic device from one or more sensors of the electronic device. The method also includes determining whether to modify a user interface button displayed on a display of the electronic device based on the received state data and parameters of a neural network. The method further includes modifying display of the user interface button on the display of the electronic device based on determining to modify. The method additionally includes providing, to the neural network, feedback data indicating whether the user interface button was triggered within a predetermined time period after modifying the user interface button.

20 Claims, 11 Drawing Sheets

(56) References Cited

U.S. PATENT DOCUMENTS

| | | |
|---|---|---|
| 2011/0063236 A1 | 3/2011 | Arai et al. |
| 2011/0242395 A1 | 10/2011 | Yamada et al. |
| 2012/0036485 A1* | 2/2012 | Watkins, Jr. .......... G06F 1/1626 |
| | | 715/863 |
| 2012/0229411 A1 | 9/2012 | Arai |
| 2013/0120464 A1 | 5/2013 | Wei et al. |
| 2013/0237288 A1* | 9/2013 | Lee .................... G06F 3/03547 |
| | | 455/566 |
| 2013/0239031 A1 | 9/2013 | Ubillos et al. |
| 2015/0106768 A1 | 4/2015 | Zimmer et al. |
| 2016/0034051 A1* | 2/2016 | Xi ........................ G06F 1/1613 |
| | | 345/156 |
| 2016/0162149 A1* | 6/2016 | Lee ...................... G06F 1/1694 |
| | | 715/835 |
| 2017/0168703 A1* | 6/2017 | Feris ..................... G06F 3/013 |
| 2017/0192511 A1* | 7/2017 | Lawrenson ............ H04N 5/232 |
| 2017/0264818 A1* | 9/2017 | Liao .................... G06F 3/04817 |
| 2018/0063317 A1* | 3/2018 | Simpson ........... H04M 1/72445 |
| 2018/0120934 A1* | 5/2018 | Taguchi ................ G06F 1/1686 |
| 2018/0284951 A1 | 10/2018 | Chana et al. |
| 2018/0302568 A1* | 10/2018 | Kim ................... H04N 5/23245 |
| 2019/0020760 A1* | 1/2019 | DeBates ................ H04M 3/42 |
| 2019/0222756 A1* | 7/2019 | Moloney ............... G06F 16/164 |
| 2019/0227702 A1* | 7/2019 | Latzina ............... G06F 3/04847 |

FOREIGN PATENT DOCUMENTS

| | | |
|---|---|---|
| KR | 10-0693088 B1 | 3/2007 |
| KR | 10-2009-0101733 A | 9/2009 |
| WO | 2005/069111 A1 | 7/2005 |

\* cited by examiner

SYSTEM AND METHOD FOR AI ENHANCED SHUTTER BUTTON USER INTERFACE

TECHNICAL FIELD

This disclosure relates generally to an electronic computing device including a graphical user interface. More specifically, this disclosure relates to modifying a displayed icon on a graphical user interface on an electronic device.

BACKGROUND

The use of portable electronic devices has greatly expanded largely due to their usability, convenience, computing power, and the like. For example, certain portable electronic devices include functions such as a media player, games, an electronic book (such as an e-reader), digital cameras, a phone, a scheduler, wireless communication, internet searching. Portable electronic devices include a graphical user interface such as a display that allows a user to view information and interact with the electronic device.

Portable electronic devices can also include a user input device such as a touch screen panels that can be used in combination with a graphical user interface (GUI). Touch screens based on GUI and touch panels can be applied to all sorts of electronic devices. If a user touches a text, a graphic, or an icon displayed on the touch screen with his finger or stylus, the electronic device detects the selection of the user based on the location, situation, and type of touch. Portable electronic devices are can be sized for carrying in one hand and allow a user to interact with the device while carrying the device. For example, a portable electronic device can be both carried and receive touch inputs by the same hand of a user.

SUMMARY

This disclosure provides systems and methods for artificial intelligent enhanced shutter button user interface.

In one embodiment, an electronic device for operating an electronic device is provided the electronic device includes a communication unit, a display, one or more sensors, and a processor. The processor is operably connected to the communication unit, the display, and the one or more sensors. The communication unit is configured to communicate with a neural network. The processor is configured to receive data about a state of the electronic device from the one or more sensors of the electronic device. The processor is also configured to determine whether to modify a user interface button displayed on the display of the electronic device based on the received state data and parameters of the neural network. The processor is further configured to modify display of the user interface button on the display of the electronic device based on determining to modify. The processor is additionally configured to provide, to the neural network, feedback data indicating whether the user interface button was triggered within a predetermined time period after modifying the user interface button.

In another embodiment, a method for operating an electronic device is provided. The method includes receiving data about a state of the electronic device from one or more sensors of the electronic device. The method also includes determining whether to modify a user interface button displayed on a display of the electronic device based on the received state data and parameters of a neural network. The method further includes modifying display of the user interface button on the display of the electronic device based on determining to modify. The method additionally includes providing, to the neural network, feedback data indicating whether the user interface button was triggered within a predetermined time period after modifying the user interface button.

In a third embodiment, a non-transitory computer readable medium embodying a computer program, the computer program comprising computer readable program code that when executed by a processor of an electronic device causes the processor to: receive data about a state of the electronic device from one or more sensors of the electronic device; determine whether to modify a user interface button displayed on a display of the electronic device based on the received state data and parameters of a neural network; modify display of the user interface button on the display of the electronic device based on determining to modify; and provide, to the neural network, feedback data indicating whether the user interface button was triggered within a predetermined time period after modifying the user interface button.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
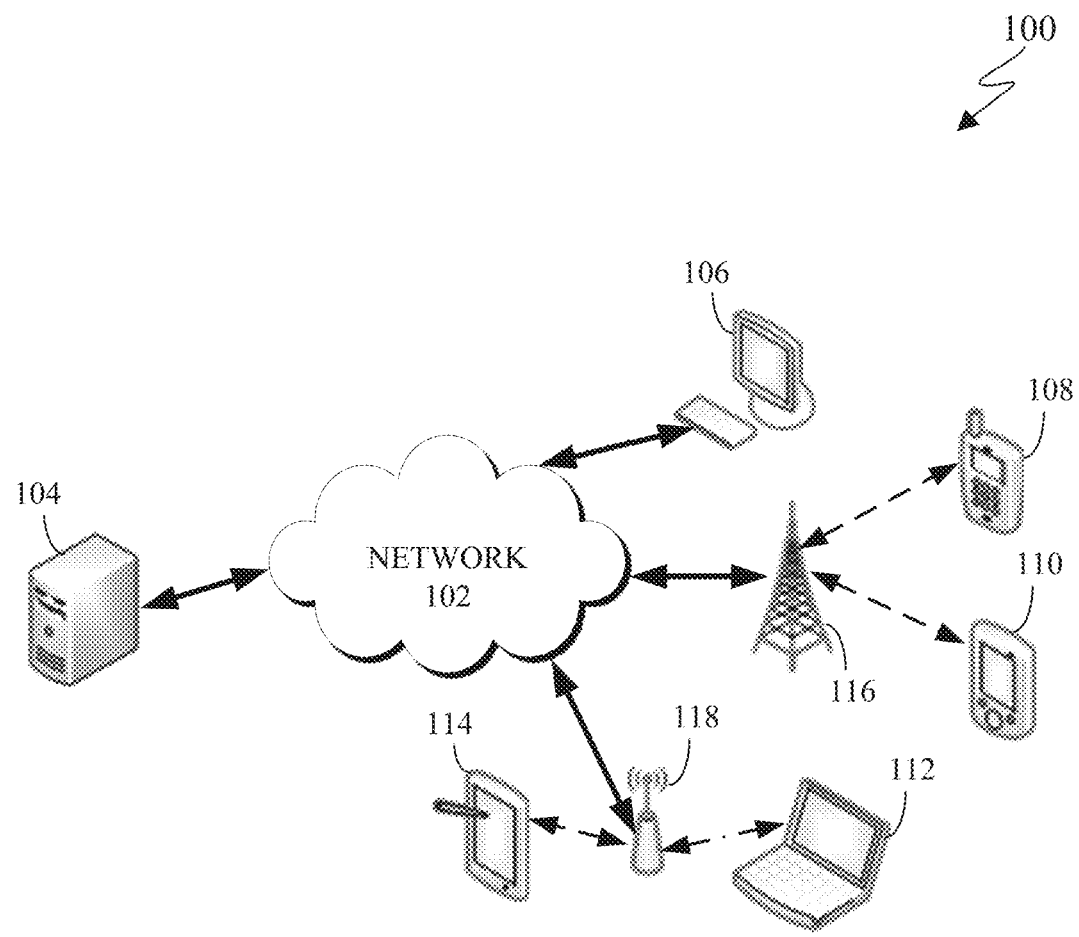
FIG. 1 illustrates an example communication system in accordance with embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

According to embodiments of the resent disclosure, content displayed on a display screen of an electronic device can include user interface objects such as, icons, images, videos, control elements such as buttons and other graphics, and the like. A user can interact with the user interface objects via a user input device, such as a keyboard, mouse, and a touchpad. If the display includes a touch panel, such as a touchscreen display, a user can interact with the content displayed on the electronic device by simply touching the display via a finger of the user or a stylus. A user can interact with one or more of the user interface objects displayed to the user. For example, a user manually adjusts the size or position of a user interface object. In another example, a user manually selects or activates one of the user interface objects.

An electronic device, according to embodiments of the present disclosure, can include personal computers (such as a laptop, a desktop), workstations, servers, televisions, appliances, and the like. In certain embodiments, an electronic device can be a portable electronic device such as a portable communication device (such as a smartphone or mobile phone), a laptop, a tablet, an electronic book reader, a personal digital assistants (PDAs), portable multimedia players (PMPs), MP3 players, mobile medical devices, cameras, and wearable devices, among others.

Embodiments of the present disclosure recognize and take into consideration that handheld portable electronic devices can be difficult for a user to touch a particular area of the touchscreen screen to interact with a user interface object while holding the device. For example, when a user is holding a smart phone with an embedded camera, touching a shutter button to capture an image with the same hand that is holding the smart phone can be difficult for the user. For instance, one handed operation of holding the smartphone and touching the shutter button to capture the image can be difficult for the user due to the location of the shutter button with respect to where the user is holding the phone. Similarly, if the phone is held over the users head it can be difficult for the user to see where the shutter button is in order to touch the button to capture the image. In another example, if the user is on a video conference on a portable electronic device, it can be difficult to touch a user interface button (such as the mute button, the volume button, or the like) while holding the device without notifying the other person, as the device can move as the user attempts to reach one handed to touch the user interface button.

Therefore, embodiments of the present disclosure provide systems and methods for detecting circumstances when a user would have difficulty pressing a user interface button on the touchscreen of an electronic device. When such circumstances are detected, the user interface button that is displayed can be adaptively modified increasing the ease of use for the user to press the user interface button. For example, the user interface button can be moved to a position easier for the user to reach. In another example, the shape of user interface button can be modified. In another example, the size of user interface button can be modified vibrations. For example, the user interface button increases in size in proportion to the magnitude of the movement or vibrations of the electronic device. In another example, the color of user interface button can be modified.

Embodiments of the present disclosure include systems and methods for detecting circumstances to modifying a user interface button. Similarly, embodiments of the present disclosure include systems and methods modifying a user interface button. The embodiments of the present disclosure improve the user experience by decreasing frustration when the user cannot easily select a user interface button. Similarly, the embodiments of the present disclosure can improve battery life of the electronic device by allowing a user to interact with the electronic device more quickly and reduce the time the display is backlit while the user is attempting to interact with the display. In certain embodiments, a neural network can be utilized to provide parameters to the electronic device of when to modify a displayed user interface button. Additionally, the neural network can learn when to modify the user interface button.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes a network 102 that facilitates communication between various components in the system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various client devices 106-114. The client devices 106-114 may be, for example, a smartphone, a tablet computer, a laptop, a personal computer, a wearable device, a head-mounted display (HMD), or the like. The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102. In certain embodiments, the server 104 is a neural network that provides parameters to one or more of the client devices 106-114 for modifying a user interface button. In certain embodiments, the server 104 is a neural network that can be trained to determine when to modify a user interface button on one or more of the client devices 106-114.

Each client device 106-114 represents any suitable computing or processing device that interacts with at least one server (such as server 104) or other computing device(s) over the network 102. In this example, the client devices 106-114 include a desktop computer 106, a mobile telephone or mobile device 108 (such as a smartphone), a personal digital assistant (PDA) 110, a laptop computer 112, and a tablet computer 114. However, any other or additional client devices could be used in the system 100. A smartphone represents a class of mobile devices 108 that are a handheld device with a mobile operating system and an integrated mobile broadband cellular network connection for voice, short message service (SMS), and internet data communication. As described in more detail below, an electronic device (such as the mobile device 108, PDA 110, laptop computer 112, and the tablet computer 114) can include a user interface engine that modifies one or more user interface buttons displayed to a user on a touchscreen.

In this example, some client devices 108-114 communicate indirectly with the network 102. For example, the client devices 108 and 110 (mobile devices 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In certain embodiments, the mobile device 108 (or any other client device 106-114) transmits information securely and efficiently to another device, such as, for example, the server 104. The mobile device 108 (or any other client device 106-114) can trigger the information transmission between itself and server 104.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device to monitor and receive state data from sensors included in the device itself. The client devices 106-114 can receive parameters from a neural network, such as server 104, that provides an indication as to whether the client device should modify a user interface button. The client devices 106-114 can also provide feedback data to the neural network, such as server 104, to indicate whether the user interface button was triggered after modifying the user interface button. The feedback data allows the neural network to learn from the actions of the user as to whether the user interface button should have been modified. For example, the feedback data allows the neural network to update the parameters that the electronic device utilizes when determining whether to modify a user interface button.

Figure 2:
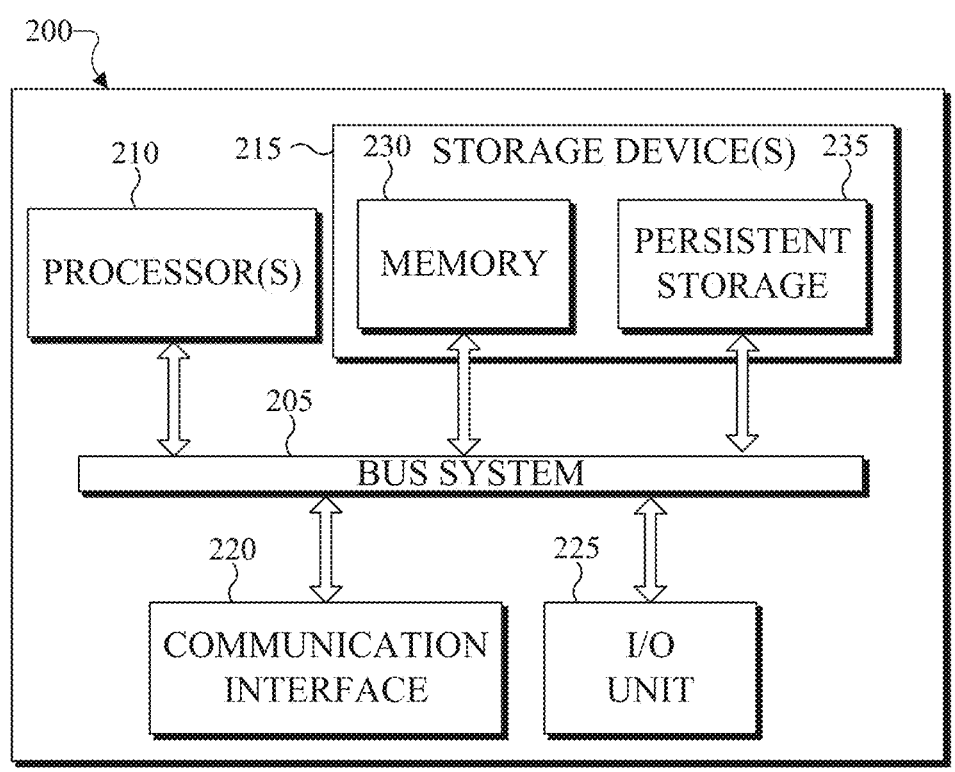
FIG. 2 illustrates an example electronic device in accordance with an embodiment of this disclosure.
Figure 3:
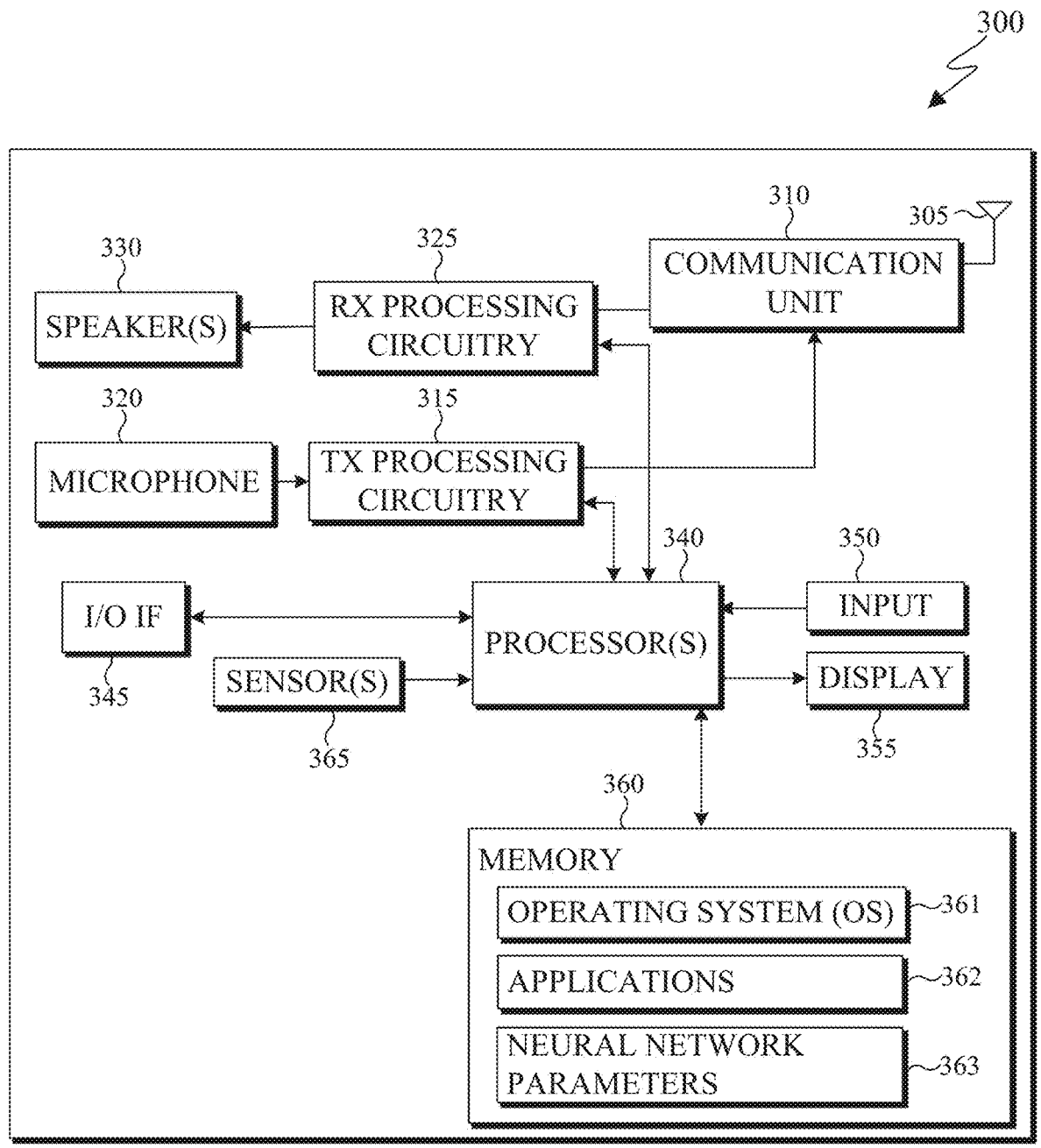
FIG. 3 illustrates an example electronic device in accordance with an embodiment of this disclosure.

FIGS. 2 and 3 illustrate example devices in a computing system in accordance with an embodiment of this disclosure. In particular, FIG. 2 illustrates an example server 200, and FIG. 3 illustrates an example electronic device 300. The server 200 could represent the server 104 in FIG. 1, and the electronic device 300 could represent one or more of the client devices 106-114 in FIG. 1.

The server 200 can represent one or more local servers, one or more remote servers, a clustered computers and components that act as a single pool of seamless resources, a cloud based server, a neural networks. The server 200 can be accessed by one or more of the client devices 106-114.

As shown in FIG. 2, the server 200 includes a bus system 205 that supports communication between at least one processing device 210, at least one storage device(s) 215, at least one communications interface 220, and at least one input/output (I/O) unit 225.

The processing device, such as processing device 210, executes instructions that can be stored in a memory 230. The processing device 210 can include any suitable number(s) and type(s) of processors or other devices in any suitable arrangement. Example types of the processing devices 210 include microprocessors, microcontrollers, digital signal processors, field programmable gate arrays, application specific integrated circuits, and discreet circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

In certain embodiments, the server 200 is a neural network that receives feedback data from one or more of the client devices 106-114 and provides parameters to the one or more of the client devices 106-114. The parameters indicate whether to modify a user interface button displayed on the display of the client device. A neural network is a combination of hardware and software that is patterned after the operations of neurons in a human brain. Neural network can solve and extract information from complex signal processing, pattern recognition, or pattern production. Pattern recognition includes the recognition of objects that are seen, heard, or felt.

Neural networks process can handle information differently than conventional computers. For example, a neural network has a parallel architecture. In another example, information is represented, processed, and stored by a neural network varies from a conventional computer. The inputs to a neural network are processed as patterns of signals that are distributed over discrete processing elements, rather than binary numbers. Structurally, a neural network involves a large number of processors that operate in parallel and arranged in tiers. For example, the first tier receives raw input information and each successive tier receives the output from the preceding tier. Each tier is highly interconnected, such that each node in tier n can be connected to multiple nodes in tier n−1 (such as the nodes inputs) and in tier n+1 that provides input for those nodes. Each processing node includes a set of rules that it was originally given or developed for itself over time.

For example, a neural network can recognize patterns in sequences of data. For instance, a neural network can recognize a pattern from numerical time series data originating from sensors associated with one of the client devices 106-114, such as the mobile device 108 that includes an internal measurement unit (IMU). The neural network can analyze time and sequence associated with the data from the IMU, to identify a pattern.

The architectures of a neural network provide that each neuron can modify the relationship between inputs and outputs by some rule. One type of a neural network is a feed forward network in which information is passed through nodes, but not touching the same node twice. Another type of neural network is a recurrent neural network. A recurrent neural network can include a feedback loop that allows a node to be provided with past decisions. A recurrent neural network can include multiple layers, in which each layer includes numerous cells called long short-term memory ("LSTM"). A LSTM can include an input gate, an output gates, and a forget gate. A single LSTM can remember a value over a period of times and can assist in preserving an error that can be back propagated through the layers of the neural network.

Neural networks can be adaptable such that a neural network can modify itself as the neural network learns and performs subsequent tasks. For example, initially a neural network can be trained. Training involves providing specific input to the neural network and instructing the neural network what the output is expected. For example, a neural network can be trained to identify when to a user interface object is to be modified. For example, a neural network can receive initial inputs (such as data from IMU sensors, user inputs, and the like) that indicate whether the user interface button should be modified. By providing the initial answers, allows a neural network to adjust how the neural network internally weighs a particular decision to perform a given task. The neural network is then able to determine based on the simple inputs whether to modify a user interface button. The neural network can then receive feedback data that allows the neural network to continually improve various decision making and weighing processes, in order to remove false positives and increase the accuracy of each decision.

FIG. 3 illustrates an electronic device 300 in accordance with an embodiment of this disclosure. The embodiment of the electronic device 300 shown in FIG. 3 is for illustration only and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the devices 104-114 of FIG. 1 can include the same or similar configuration as electronic device 300.

In certain embodiments, the electronic device 300 is useable with data transfer applications, such providing and receiving information from a neural network. In certain embodiments, the electronic device 300 is useable user interface applications that can modify a user interface based on state data of the electronic device 300 and parameters of a neural network. The electronic device 300 can be a mobile communication device, such as, for example, a mobile station, a subscriber station, a wireless terminal, a desktop computer (similar to desktop computer 106 of FIG. 1), a portable electronic device (similar to the mobile device 108 of FIG. 1, the PDA 110 of FIG. 1, the laptop computer 112 of FIG. 1, and the tablet computer 114 of FIG. 1), and the like.

As shown in FIG. 3, the electronic device 300 includes an antenna 305, a communication unit 310, a transmit (TX) processing circuitry 315, a microphone 320, and a receive (RX) processing circuitry 325. The communication unit 310 can include, for example, a RF transceiver, a BLUETOOTH transceiver, a WI-FI transceiver, ZIGBEE, infrared, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361 one or more applications 362, and neural network parameters 363.

The communication unit 310 receives, from the antenna 305, an incoming RF signal transmitted such as a BLUETOOTH or WI-FI signal from an access point (such as a base station, WI-FI router, Bluetooth device) of the network 102 (such as a WI-FI, Bluetooth, cellular, 5G, LTE, LTE-A, WiMAX, or any other type of wireless network). The communication unit 310 down-converts the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data and remittance).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 is also capable of executing other applications 362 resident in the memory 360, such as, one or more applications that include user interface buttons that can be modified. Example, applications 362 that include user interface buttons include, but not limited to a camera application (for still images and videos), a video phone call application, an email client, a social media client, and the like.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute plurality of applications 362 based on the OS 361 or in response to signals received from eNBs or an operator. In certain embodiments, the processor 340 is configured to execute the neural network parameters 363, and when a parameter is achieved the processor 340 is also configured to execute one or more application s such as application 362 in order to modify a user interface button. The processor 340 is also coupled to the I/O interface 345 that provides the electronic device 300 with the ability to connect to other devices, such as client devices 104-116. The I/O interface 345 is the communication path between these accessories and the processor 340.

The processor 340 is also coupled to the input 350 and the display 355. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing thereby allowing a user to input a voice command. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. Input 350 can be associated with sensor(s) 365 and/or a camera by providing additional input to processor 340. In certain embodiments, sensor 365 includes IMU sensors including inertial sensors (such as, accelerometers, gyroscope, and magnetometer) and motion sensors, optical sensors, cameras, pressure sensors, heart rate sensors, altimeter, breath sensors (such as microphone 320), and the like. The input 350 can also include a control circuit. In the capacitive scheme, the input 350 can recognize touch or proximity. The display 355 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc. The memory 360 also can contain neural network parameters 363 received from one or more neural networks. The neural network parameters 363 can include data that indicates when to modify a user interface button. In certain embodiments, the neural network parameters 363 and the state data of the electronic device 300 are used in combination whether to indicate when to modify a user interface button.

Electronic device 300 further includes one or more sensor(s) 365 that can meter a physical quantity or detect an activation state of the electronic device 300 and convert metered or detected information into an electrical signal. For example, sensor 365 can include one or more buttons for touch input, a camera, a gesture sensor, an IMU sensors (such as a gyroscope or gyro sensor and an accelerometer), an air pressure sensor, a magnetic sensor or magnetometer, a grip sensor, a proximity sensor, a color sensor, a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. A further description of IMU sensors is found with respect to FI. 4 below. The sensor 365 can further include a control circuit for controlling at least one of the sensors included therein. The sensor(s) 365 can be used to determine whether the electronic device 300 is held in one hand or two hands. The sensors 365 can be used to determine whether the electronic device 300 is being quickly being raised or lowed in elevation, such as a user lifting or lowering the electronic device 300 upwards or downwards respectively. Any of these sensor(s) 365 can be located within the electronic device 300.

Although FIGS. 2 and 3 illustrate examples of devices in a computing system, various changes can be made to FIGS.

2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
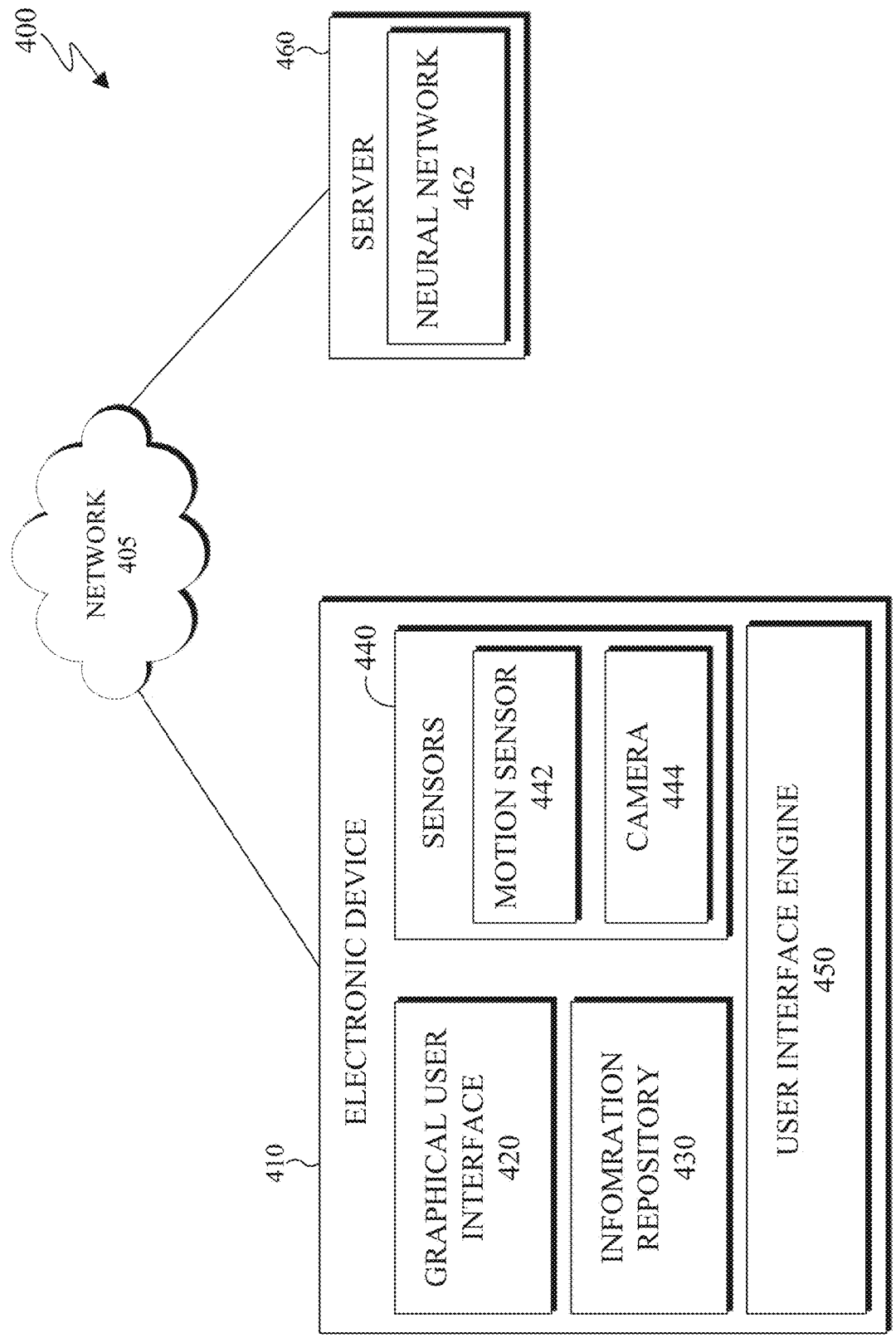
FIG. 4 illustrates an example block diagram in accordance with an embodiment of this disclosure.

FIG. 4 illustrates an example block diagram 400 in accordance with an embodiment of this disclosure. In particular, FIG. 4 illustrates a high-level architecture, in accordance with an embodiment of this disclosure. The embodiment of the block diagram 400 shown in FIG. 4 is for illustration only. Other embodiments can be used without departing from the scope of the present disclosure. The block diagram 400 includes an electronic device 410 and a server 460 communicating over a network 405.

The network 405 can be configured similar to the network 102 of FIG. 1. The electronic device 410 can be configured similar to any of the client devices 106-114 of FIG. 1 (such as mobile device 108) and can include internal components similar to that of the electronic device 300 of FIG. 3. Server 460 can be configured similar to server 104 of FIG. 1 and include internal components similar to the server 200 of FIG. 2.

Network 405 is used to provide communication between the electronic device 410 and the server 460. Network 405 can be a short range communication network (such as a Near Field Communication (NFC) or BLUETOOTH), personal area network (PAN), Local Area Networks (LANs), Wireless Local Area Networks (WLANs), wide area networks (WAN), the Internet, the Public Switched Telephone Network (PSTN), WAN such as public cellular service as well as other wireless networks. Network 405 can also be the Internet or other remote networks, representing a worldwide collection of networks and gateways that use Transmission Control Protocol/Internet Protocol (TCP/IP) protocols to communicate with one another. Network 405 can include a variety of connections, such as, wired, wireless or fiber optic connections. In certain embodiments, the network 405 represents a "cloud" of computers interconnected by one or more networks, where the network 405 is a computing system utilizing clustered computers and components to act as a single pool of seamless resources when accessed.

The electronic device 410 represents any number of electronic devices similar to the client devices 106-114 of FIG. 1. The electronic device 410 can modify a user interface button displayed on a display of the electronic device 300. In certain embodiments, the electronic device 410 is similar to a smart phone (similar to the mobile device 108 of FIG. 1), a head mounted display, a wearable device, a desktop computer (similar to the desktop computer 106 of FIG. 1), a laptop computer (similar to the laptop computer 112 of FIG. 1), a tablet computer (similar to the tablet computer 114 of FIG. 1), and the like. Additional examples of the electronic device 410 includes a cellular phone, a smart phone a PDA (similar to the PDA 110 of FIG. 1), an image sensing device such as a digital camera, a gaming device, a music storage and playback device, a household appliance capable of wireless Internet access and web browsing, and a portable unit or terminal integrating the functions of the aforementioned items. The electronic device 410 includes a graphical user interface (GUI) 420, an information repository 430, sensors 440, and a user interface engine 450.

The GUI 420 is a display (similar to the display 355 of FIG. 3) configured to display a user interface. The user interface includes user interface objects such as icons, images, videos, and control elements such as buttons, graphics, and other visual indications, and the like. The user interface objects allow a user the ability to interact with the various functionalities provided by the electronic device 410 such as taking a picture, making a phone call, word processing, drafting, reading, and sending e-mails, playing games, selecting music or a video to be played, and the like. The GUI 420 can include a touchscreen that allows a user to directly interact with the electronic device 410 via a finger of the user or a stylus. For example, the GUI 420 is a display and affixed to the electronic device 410 that can receive inputs from a user directly on the display.

The information repository 430 can be similar to memory 360 of FIG. 3. The information repository 430 represents any structure(s) capable of storing and facilitating retrieval of information (such as data, program code, or other suitable information on a temporary or permanent basis). The information repository 430 can include a memory and a persistent storage. Memory can be RAM or any other suitable volatile or non-volatile storage device(s), while persistent storage can contain one or more components or devices supporting longer-term storage of data, such as a ROM, hard drive, Flash memory, or optical disc. The information repository 430 stores the neural network parameters 363 (depicted in FIG. 3), received from the neural network 462. The information repository 430 can store data gathered by sensors 365 of FIG. 3, such as IMU data, camera data, and geographical locations. Additional data stored in information repository 430 can include state data based on the data gathered by the sensors, modifiable user interface objects, and the like.

In certain embodiments, electronic device 410 can communicate with one or more servers in addition to server 460. The electronic device 410 is able to download or receive from the additional servers various applications that include modifiable user interface buttons. The electronic device 410 is able to download or receive from the additional servers modifiable user interface buttons. The downloaded or received applications and modifiable user interface buttons can be maintained in the information repository 430.

The sensors 440 are similar to sensor 365 of FIG. 3. The electronic device 410 captures data associated with the user from the sensors 440. The data captured by the sensors 440 can be maintained in the information repository 430. The data captured by sensors 440 is utilized by the user interface engine 450 when determining whether to modify one or more user interface buttons and in the generation of feedback data to the neural network 462. The sensors 440 provide motion tracking of the electronic device 410. The sensors 440 also provide image data of the user and surrounding areas. The sensors 440 include motion sensor 442 and camera 444.

The motion sensor 442 include various sensors that detect movement of the electronic device such as, accelerometers, gyroscopes, altimeters, grip sensors, global positioning sensors, and the like. In certain embodiments, the motion sensor 442 includes IMU sensors that detect and measure specific forces, associated with movements of the electronic device 410. An IMU sensor can detect when the electronic device 410 moves and allows the electronic device 410 to calculate the force of movement in a particular direction. For example, the electronic device 410 can detect changes in elevation, such as when a user lifts the electronic device 410 over the head of the user. Based on the type of motion, the user interface engine 450 can determine whether the electronic device 410 was in an elevator or whether the electronic device 410 was physically lifted upwards by a user. In certain embodiments, the motion sensor 442 can sense if the electronic device 410 is held in one hand or two hands. For example, if the electronic device 410 is held in one hand, the electronic device 410 may shake disproportionally on one side than the other. For instance, the side of the electronic device 410 that is being held by a user will shake less than the side of the electronic device 410 that is not being held. In certain embodiments, the motion sensor 442 can detect the orientation of the electronic device 410. For example, the motion sensor 442 can detect whether the electronic device 410 is in landscape or portrait mode. Based on the data captured by the motion sensor 442, the user interface engine 450 identifies whether the user of the electronic device 410 has difficulty touching the entirety of the touchscreen of the GUI 420.

The camera 444 includes one or more cameras. For example, if the electronic device 410 is a smart phone, the electronic device can have a front camera that faces the user when the user views the display and a back camera that faces opposite the display. The camera 444 is able to view an environment and convert the information into digital form. That is, the camera 444 is capable of generating a sequence of images of videos and transmitting the generated data to the information repository 430, the user interface engine 450, or both. The camera 444 can include any number of devices that can capture or generate an image. For example, the camera 444 can include one or more of a color camera, a video camera, a depth camera, a motion sensor, radar, sonar, infrared (IR), and the like. Based on the data captured by the camera 444, the user interface engine 450 can identify whether the user of the electronic device 410 has difficulty touching the entirety of the touchscreen of the GUI 420.

The user interface engine 450 receives information from the sensors 440. The information received can include state data. The state data indicates the state of the electronic device. For example, the state data can indicate whether the electronic device is being raised. In another example, the state data can indicate whether the electronic device is held in one hand. In another example, the state data can indicate whether the electronic device is on an application is opened that has one or more user interface buttons that can be modified. In another example, the state data indicates whether the electronic device is held in landscape or portrait. In another example, the state data can include image data of the user and the area sounding the user. For instance, the state data can reflect whether the content within the image data changes, such as when the face of the user is within the content of the image and then at a later time is not within the content of the image. In another example, the state data can include global positioning information to locate the electronic device 410. For instance, if the global positioning information indicates that the user is at a theater, a user interface button is modify based on the users location, such as changing the color, shape, or position of the user interface button to provide the user easier visibility of the user interface button based on ambient lighting or move the location of the user interface button closer to a finger of the user.

When the GUI 420 is a touch screen, a user can hold the electronic device 410, and touch the screen at various locations at particular areas to execute the various functions of the electronic device 410. Due to the size of the screen it can be difficult for a user to hold the electronic device 410 and interact with the touchscreen of the GUI 420 with the same hand. The user interface engine 450 detects when the user could have difficulty touching a user interface button, and modify one or more buttons to improve the user experience. In certain embodiments, the user interface engine 450 detects when a user could have difficulty interact with the electronic device 410 via the touchscreen of the GUI 420 and modify one or more of the user interface buttons. For example, the user interface button can be moved to a position easier for the user to reach. In another example, the shape of user interface button can be modified. In another example, the size of user interface button can be modified. In another example, the color of user interface button can be modified.

In certain embodiments, the user interface engine 450 determines whether to modify a user interface button based on the state data of the electronic device and received neural network parameters from the neural network 462. For example, the neural network parameters specify that the state data indicates that if (i) the electronic device 410 has a camera application open (that allows a user to capture a picture via a camera, such as the camera 444) and (ii) raises the phone (as detected by motion sensor 442), then the shutter button of the camera application is to be modified. For instance, the shutter button can increase in size (increasing the ability of the user to reach the shutter button), change position on the GUI 420 (increasing the ability of the user to reach the shutter button), change color (increasing its visibility to the user), and the like. In another example, the neural network parameters specify that the state data indicates that if (i) the electronic device 410 has a camera application open, and (ii) the face of the user gradually leaves the line of sight of the camera, then the shutter button of the camera application is to be modified. For instance, the shutter button can increase in size (increasing the ability of the user to reach the shutter button), change position on the GUI 420 (increasing the ability of the user to reach the shutter button), change color (increasing its visibility to the user), and the like. In another example, if the (i) the electronic device 410 has a camera application open, (ii) the motion sensor data indicates that the phone is held, and (iii) the motion sensor data indicates electronic device 410 is held in one hand, then the shutter button of the camera application is to be modified. The mentions sensor data can indicate that the electronic device 410 is held in one hand if motion on one side of the electronic device 410 is greater than another side by a threshold.

The user interface engine 450 can also determine a confidence level based on the parameters received from the neural network and the state data. The confidence level is an indication as to how confident the user interface engine 450 regarding whether to modify a user interface button or not modify a user interface button. For example, the user interface engine 450 can create a continuum of confidence levels that are utilized to determine whether to modify a user interface button. In certain embodiments, the user interface engine 450 can perform different tasks based on the determined confidence level.

In certain embodiments, the camera 444 can be used to capture the eyes of the user. For example, the user interface engine 450 can determine whether to modify a user interface button based on whether the eyes of the user are detected. In certain embodiments, the camera 444 can be used to capture the face of the user when viewing the GUI 420. For example, the user interface engine 450 can determine whether to modify a user interface button based whether the face of the user is detected. In another example, the user interface engine 450 can determine whether to modify a user interface button based whether a derived angle between the face of the user and the camera 444 changes. In another example, the user interface engine 450 can determine whether to modify a user interface button based whether the face of the user leaves the line of sight of the camera within a predetermined time period. In certain embodiments, the camera 444 can be used to capture the gaze direction of the user. For example, the user interface engine 450 can determine whether to modify a user interface button based whether a user is viewing the GUI 420. In certain embodiments, the camera 444 can be used to capture a landmark. For example, the camera 444 can the camera that the user is using to take a picture, and if the subject matter of the image includes a particular object, the user interface engine 450 can determine whether to modify a user interface button. For instance, the user interface engine 450 can utilize object recognition technology to determine an object within the image. If the user is about to take a picture of a stage during a concert, the user interface engine 450 can recognize the stage, the lights, the noise (via a microphone) the location of the user (via global positioning information) and the like and adjust the user interface button accordingly.

In certain embodiments, in response to determining to modify a user interface button, the user interface engine 450 can determine how to modify the user interface button. For example, the user interface engine 450 can change the color, share, size, or a combination thereof of the user interface button. For instance, the user interface button increases in size in proportion to the magnitude of detected vibrations. The color of the user interface button can change based on ambient color as detected by the camera 444. For instance, the user interface button can change to a color that contrasts with ambient color as captured by the camera 444. In another example, the user interface button can be relocated to a new position on the GUI 420. For instance, the camera 444 can locate a finger position of the user and move user interface button to a location in close proximity to the finger of the user. If the electronic device 410 is held in one hand, the user interface engine 450 can modify the user interface button by the moving the user interface button towards the side of the electronic device 410 that is held by the user.

Server 460 can represent one or more local servers, one or more tracking device servers, or one or more asset management servers. Server 460 can be a web server, a server computer such as a management server, or any other electronic computing system capable of sending and receiving data. In certain embodiments, server 460 is a "cloud" of computers interconnected by one or more networks, where server 460 is a computing system utilizing clustered computers and components to act as a single pool of seamless resources when accessed through network 405. Server 460 can include a neural network 462. In certain embodiments, server 460 is a neural network, similar to the neural network 462.

Server 460 includes a communications interface that supports communications with other systems or devices. For example, the communications interface (similar to the communication interface 220 of FIG. 2) can include a network interface card or a wireless transceiver facilitating communications over the network 405. The communications interface supports communications through any suitable physical or wireless communication link(s), such as the electronic device 410 that sends feedback information to the server for further training for the neural network 462. The communication interface can also allow the server 460 to transmit neural network parameters (similar to the neural network parameters 363 of FIG. 3) generated by the neural network the 462 to the electronic device 410.

The neural network 462 is trained to detect patterns of when a user has difficulty reaching a user interface button. The neural network 462 generates a set of parameters that are transmitted to the electronic device 410. The neural network parameters can be trained to a specific user or trained for the general public. The neural network 462 can receive feedback data from the electronic device 410 and based on the feedback data update the set of parameters. For example, neural network 462 can create a set of parameters that is received by electronic device 410. Thereafter, each electronic device 410 can transmit feedback data to the neural network 462. The neural network 462 analyzes the feedback data and weighs the data to update the parameters. The parameters can be updated universally such that each electronic device 410 receives the same set of parameters. The parameters can be updated to each specific electronic device 410.

The feedback data allows the neural network 462 to identify false positives, such as when the user interface engine 450 determines to move a user interface button based on the state date of the electronic device 410 and the neural network parameters, but the user does not select the moved user interface button. Stated differently, the user interface button is moved and the user did not interact with the moved user interface button after it moved. Another example of a false positive result is when the when the user interface engine 450 determines to automatically perform an action based on a high confidence level (as determined based on the state data and the neural network parameters), and the user undoes the automated action. For example, if the user interface engine 450 determines that a user is going to take a picture with high confidence and automatically engages the shutter button and takes the picture (instead of moving the shutter button), and thereafter within a predetermined period, the user deletes the image, the feedback data indicates a false positive. The feedback data can confirm that a the neural network parameters indicated a correct instance of user having difficulty selecting the user interface button, such as when the user interface engine 450 determines to move a user interface button based on the state date of the electronic device 410 and the neural network parameters, and the user selects the moved user interface button.

In certain embodiments, the neural network 462 is a LSTM type deep neural network. A LSTM neural network can use the following equations to derive patterns for the neural network parameters and incorporating the feedback data to further train the neural network and improve the parameters used by the user interface engine 450. In certain embodiments, to determine when to modify a user interface button, the neural network can utilize a one-dimensional time signal, based on the following equation relationships:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$z_t = \tanh(W_{xc}x_t + W_{hc}h_{t-1} + b_c)$$

$$c_t = f_t \odot c_{t-1} + i_t \odot z_t$$

$$o_t = \sigma(W_{xo}x_t + W_{ho}h_{t-1} + W_{co}c_t + b_o)$$

$$h_t = o_t \odot \tanh(c_t) \qquad \text{Equation (1)}$$

In the above equations, t refers to the time. As discussed above the LSTM neural network includes an input gate, a forget gate, and an output gate. The variable $i_t$ denotes the input gate activation vector. The variable $f_t$ denotes the forget gates activation vector. The variable $o_t$ denotes the output gate activation vector. Additionally, $c_t$ denotes the cell state of the vector. The variable $x_t$ represents the input vector to the LSTM unit. The variable $h_t$ is the output vector of the LSTM unit. The variable W represents a matrix that weights the inputs and recurrent connections.

For example, when determining and updating the parameters that indicate whether the user interface engine 450 is to modify a user interface button, the neural network 462 can analyze various sensor and state data. For example, camera 444 can generate sensor data that includes whether a face of a user is visible in the image captured by the camera 444. For instance, when the face of the user is visible in the camera, the shutter button can be in the pre-programed default setting (position, color, size, shape, and the like). If the face of the user is not visible in the line of sight of the camera, then the neural network can determine whether the user is holding the electronic device 410 away and above the head of the user. The neural network can also detect whether the background of the image without the user face is similar to background of the image with the users' face. If a similarity is detected, then it can be identified whether the user lifted the phone above the head of the user. In another example, sensor data can be received from the motion sensor 442. The motion sensor 442 can include accelerometer data from an IMU sensor, gyroscopic data from an IMU sensor. The sensor data (camera images, IMU sensor data) can be inputted as vectors into the LSTM equations discussed above. If the output the LSTM neural network is binary, a '0' can indicate that the user interface button is in a default mode. Similarly, if the output the LSTM neural network is binary, a '1' can indicate that the user interface button is in a modified mode. In certain embodiments, the LSTM output can be a value between '0' and '1.' For example, the larger the value the larger the user interface button is. In another example, the smaller the value the closer the user interface button is to the right of the screen, whereas the larger the value the closer the user interface button is to the left of the screen. In another example, the larger the value the closer the user interface button is to the right of the screen, whereas the smaller the value the closer the user interface button is to the left of the screen. Additionally, values generated from the LSTM neural network can indicate the size, shape, position color, location of the user interface button.

Figure 5:
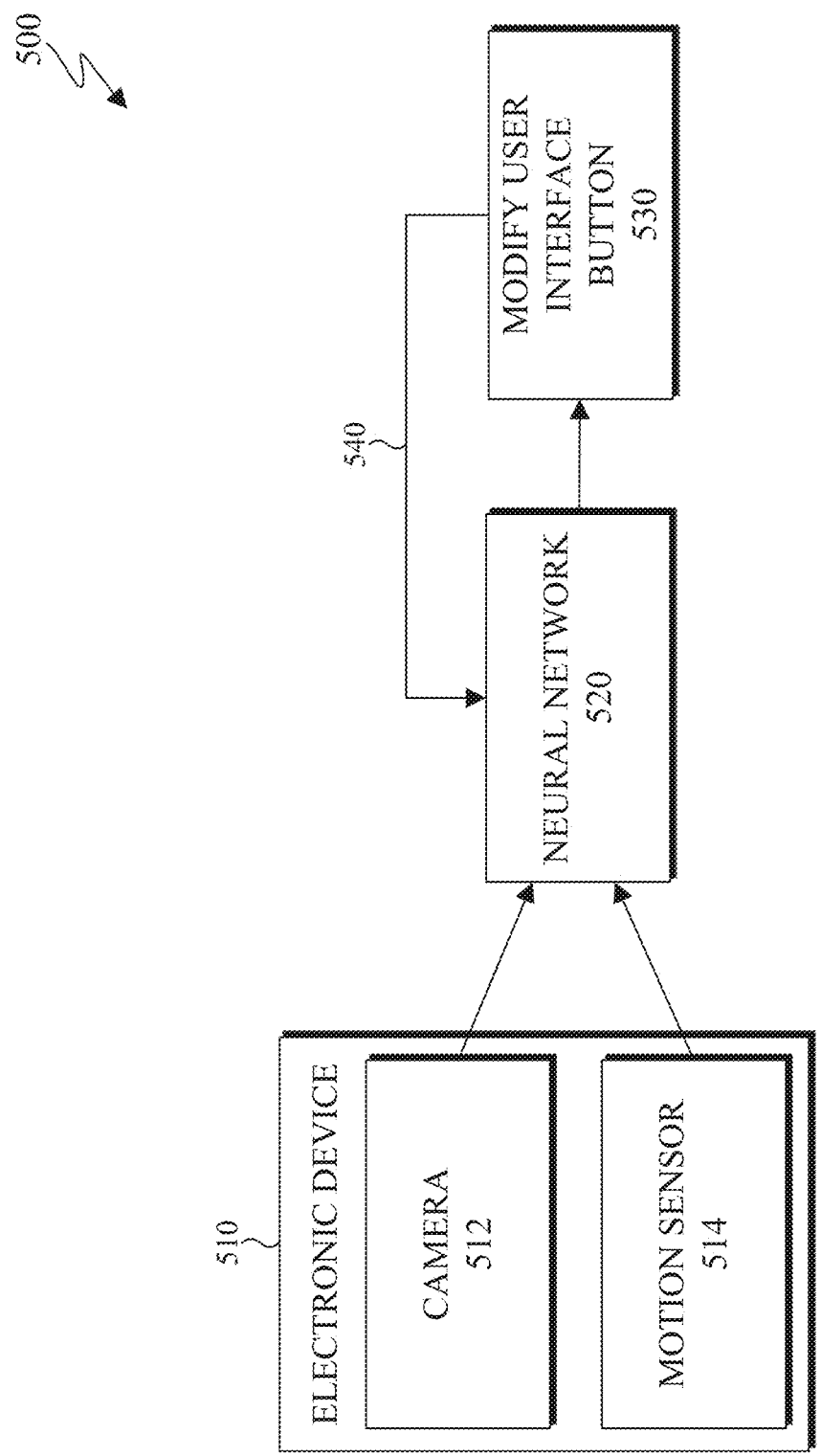
FIG. 5 illustrates an example block diagram of a communication system for modifying a display in accordance with an embodiment of this disclosure.

FIG. 5 illustrates an example block diagram of a communication system 500 for modifying a display in accordance with an embodiment of this disclosure. The embodiment of the communication system 500 shown in FIG. 5 is for illustration only. Other embodiments can be used without departing from the scope of the present disclosure. The communication system 500 includes an electronic device 510, a neural network 520, and a modify user interface button 530.

The electronic device 510 is similar to the electronic device 410 of FIG. 4, and the client devices 106-114 of FIG. 1, and includes internal components similar to the electronic device 300 of FIG. 3. The neural network 520 is similar to the neural network 462 of FIG. 4 and includes internal components similar to the server 200 of FIG. 2. In certain embodiments, the neural network 520 determines whether to modify the user interface button 530. In certain embodiments, decision to modify the user interface button 530 is performed by the electronic device 510, similar to the neural network parameters and the user interface engine 450 of FIG. 4.

The electronic device 510 includes a camera 512 and a motion sensor 514. The camera 512 and motion sensor 514 are similar to the sensors 440 of the electronic device 410 of FIG. 4. In particular the camera 512 is similar to the camera 444 of FIG. 4 and the motion sensor 514 is similar to the motion sensor 442 of FIG. 4. The camera includes one or more cameras and can be located on one or more sides of the electronic device 510. For example, a first camera can face a user and capture the face of the user when the user is facing a display of the electronic device 510, and another camera can be opposite that of the first camera. The motion sensor 514 can be a geographic location sensor, or an IMU sensor that detects the motion of the electronic device 510 or a combination thereof.

In certain embodiments, the electronic device 510 sends image data from the camera 512 that faced the user, and motion sensor data from motion sensor 514 such as an accelerometer, or a gyroscope or both. The neural network 520 receives the data and determines whether to modify the user interface button 530. Dependent on whether the user interface button was modified and whether the user interface button was activated, on-line learning 540 can occur. On-line learning 540 is similar to the feedback data discussed above with respect to FIG. 4. For example, if the user interface button was modified and the user engaged the modified user interface button, then on-line learning 540 can occur. In another example, if the user interface button was modified but the user did not engage the modified use interface button, then on-line learning 540 can still occur as a weighted indication of a false trigger to modify the user interface button 530. In another example, if the user interface button was not modified, and the user engaged a particular user interface button, the on-line learning 540 can allow the neural network 520 to determine if a modification can assist the user. The neural network 520 determines whether to modify the user interface button 530 and the on-line learning 540 allows the neural network 520 to identify and correct false positives. For example, if the on-line learning 540 indicates that the user did not engage the modified user interface button, then the neural network 520 was incorrect in triggering the instruction to modify the user interface button 530. The on-line learning 540 allows the neural network to adjust the internal weighing of the neural network via backpropagation in order to reduce future false positives.

Figure 6A:
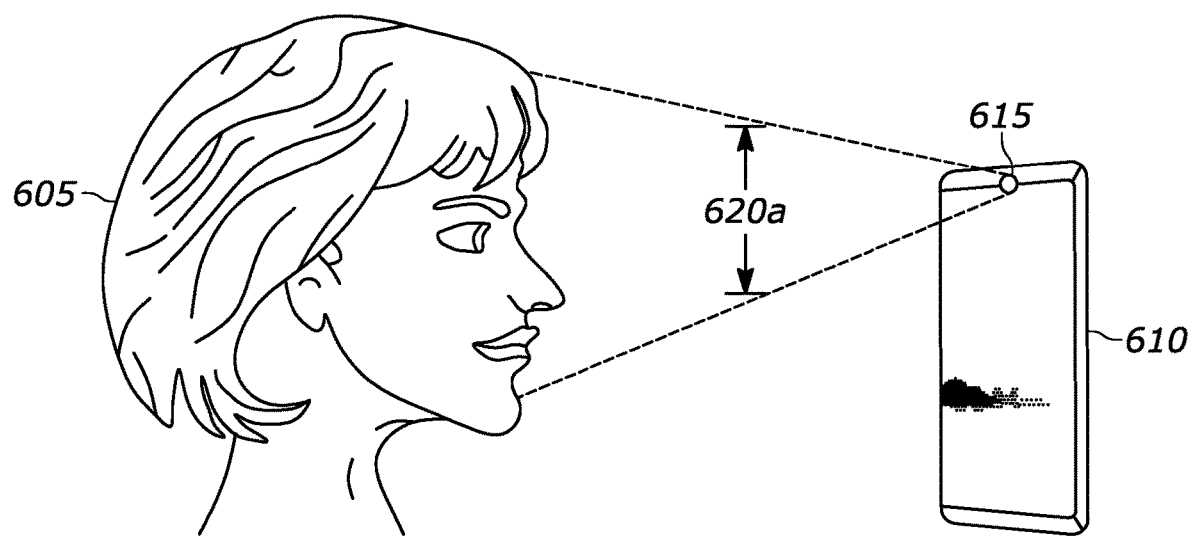
FIGS. 6A, 6B, and 6C illustrate an example diagram for modifying a display in accordance with an embodiment of this disclosure.
Figure 6B:
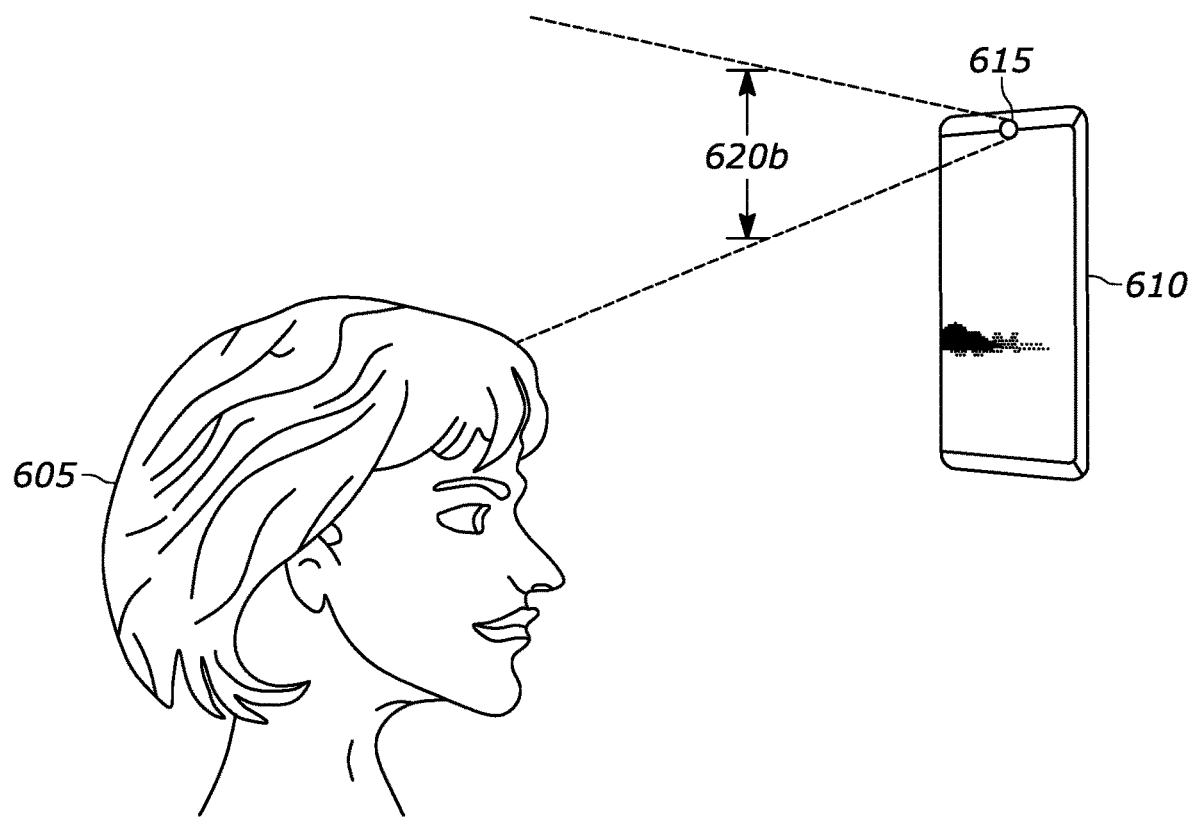
Figure 6C:
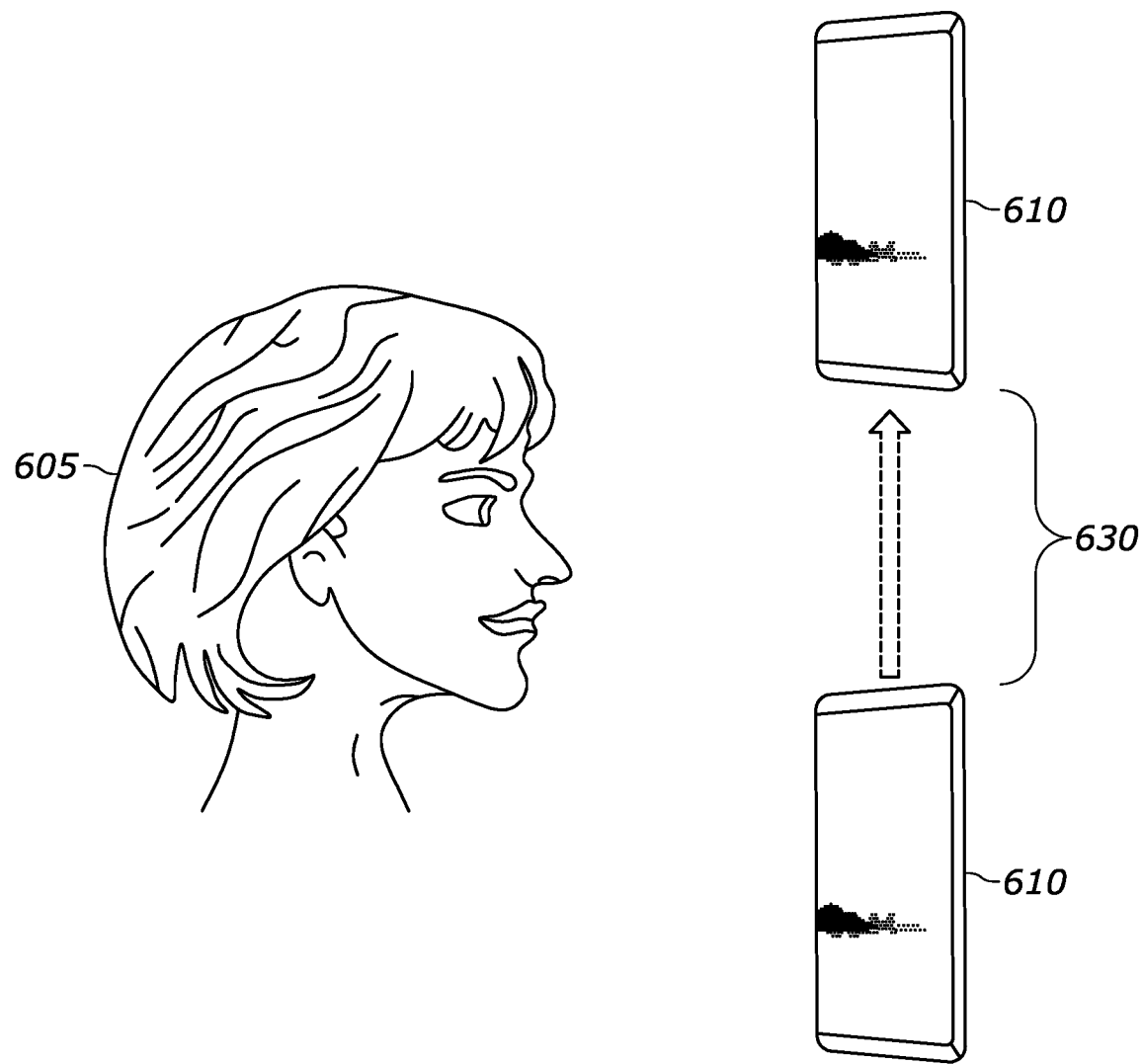

FIGS. 6A, 6B, and 6C illustrate example diagrams for modifying a display in accordance with an embodiment of this disclosure. FIGS. 6A, 6B, and 6C depict electronic device 610. The electronic device 610 is similar to the electronic device 510 of FIG. 5, the electronic device 410 of FIG. 4, any of the client devices 106-114 and can include internal components similar to that of the electronic device 300 of FIG. 3. Camera 615 is similar to the camera 512 of FIG. 5, camera 444 of FIG. 4, and sensor 365 of FIG. 3. The upward motion 630 can be detected by the motion sensor 514 of FIG. 5, the motion sensor 442 of FIG. 4, and the sensor 365 of FIG. 3.

FIGS. 6A and 6B illustrate example diagrams of an electronic device 610 and a camera 615 that can detect whether the electronic device 610 is raised above the head of the user. When the electronic device 610 is raised above the head of the user, such as when the user desires to take a picture, it is difficult for the user to find the shutter button to capture a picture. Similarly, FIG. 6C illustrates an example diagram of an electronic device 610 detecting an upward motion, such as being raised above the head of the user, similar to FIG. 6B.

FIG. 6A illustrates a user 605 viewing electronic device 610. The camera 615 includes a range of sight 620a that is able to capture the face of the user 605. In FIG. 6B the electronic device 610 is raised over the head of the user 605. The range of sight 620b of the camera 615 does not capture the face of the user. In certain embodiments, the camera 615 can continually detect the face of the user 605, allowing the user interface engine 450 of FIG. 4 to determine when to modify the user interface button based on the amount of the detected face of the user 605 that remains in the range of sight of the camera 615. In certain embodiments, the user interface engine 450 can detect the face of the user 605 gradually decreasing via camera 615 as the electronic device 610 is moved upwards over the head of the user 605. The user interface engine 450 can then determine whether to modify the user interface button based on the amount of the detected face of the user 605 remains in the line of site of the camera 615.

FIG. 6C illustrates a user 605 viewing electronic device 610. The IMU sensors detect upward motion 630, such that the electronic device 610 d is located above the user's head. When the electronic device 610 is located above the user 605, the user 605 is unable to view the display. Therefore, the user interface engine 450 can trigger the modification of a user interface button.

In certain embodiments, the camera 615 of FIGS. 6A and 6B and the IMU sensors that detect the upward motion 630 can be combined in a single electronic device. By combining both the camera 615 IMU sensors that detect the upward motion 630 can improve the accuracy of the determination made by the user interface engine 450.

Figure 7:
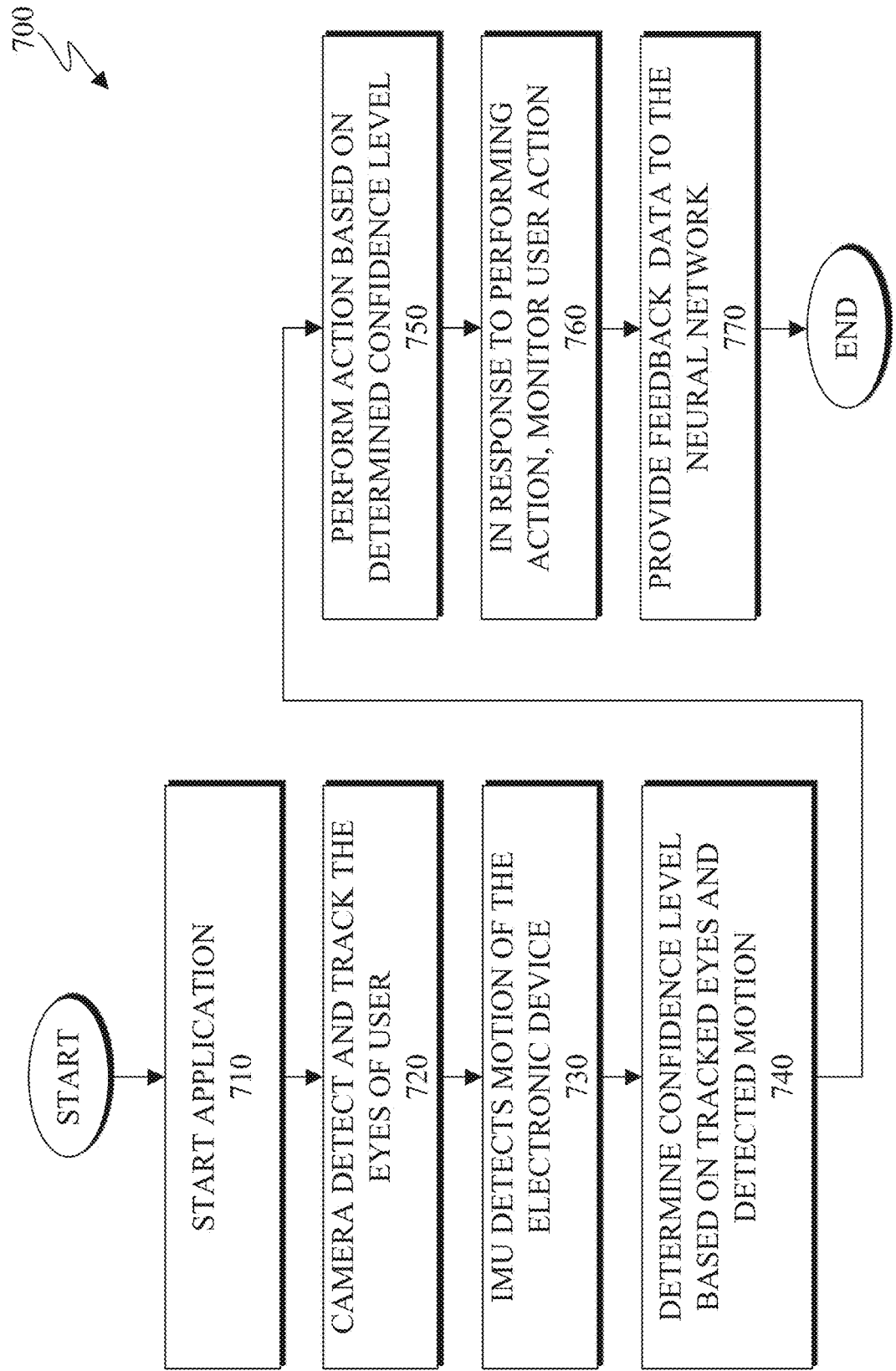
FIG. 7 illustrates an example method for modifying a display in accordance with an embodiment of this disclosure.

FIG. 7 illustrates an example method for modifying a display in accordance with an embodiment of this disclosure. FIG. 7 depicts flowchart 700 for modifying a user interface. The steps of the flowchart 700 can occur in series, in parallel, concurrently, or in an overlapping manner. Additionally, no inference should be drawn from that sequence regarding specific order of performance. In certain embodiments, various steps of the flowchart 700 can be omitted. The flowchart 700 depicts a method that is similar to the diagrams of FIGS. 6A, 6B, and 6C. The method depicted in FIG. 7 is described as implemented any of the client devices 106-114 of FIG. 1, the electronic device 300 of FIG. 3, the electronic device 410 of FIG. 4, the electronic device 510 of FIG. 5, or the electronic device 610 of FIG. 6.

At step 710, the electronic device 610 starts an application. The application can be started based on a user input, or automatically performed such as in response to the occurrence of an event or received information. The application can include one or more user interface buttons that can be modified. The application can be a camera application, a phone calling application, a video calling application, a game, an email application, a retail application, or the like. For example, the user interface button can be a shutter button of a camera application. In another example, the user interface button can be the hang up button for a phone call or video call. In another example, the user interface button can be the send button for an email or text message. In another example, the user interface button can be the purchase button for a shopping application. In another example, the user interface button can be the search button for a web browser. The application can be any type of application or program accessed on the electronic device 610. The application includes one or more user interface icons that can be modified, such as the ability of the electronic device 610 to relocate or move the position of the user interface button, alter the shape, size, or color of the user interface button, or any combination thereof. In certain embodiments, the application can be the home screen of the electronic device 610, such as the main display that depicts one or more windows or icons that can be selected by the user.

At step 720, a camera (similar to camera 444 of FIG. 4, the camera 512 of FIG. 5, or the camera 615 of FIGS. 6A and 6B) is affixed to the electronic device 610 and detects and tracks the eye of the user. The camera can be a forward facing camera that can capture the face of the user when the user is viewing the screen of the electronic device 610. In certain embodiments, the camera can detect the eyes of the user. The camera can detect whether the eyes of the user gradually move away from the field of view of the camera. For example, detecting whether the eyes of the user gradually move away from the field of view of the camera can include determining if the eyes of the user leave the line of site of the camera over a predetermined time period. In certain embodiments the camera can track the eye gaze of the user. For example, the camera can detect whether the eyes of the user are looking at the display screen of the electronic device 610. The camera can track the eye gaze of the user and then determine whether the user is looking at the display screen of the electronic device 610.

At step 730, an IMU sensor (similar to the sensor 365 of FIG. 3, the motion sensor 442 of FIG. 4, and the motion sensor 514 of FIG. 5) detects motion of the electronic device 610. In certain embodiments, the IMU sensor can detect upward motion of the electronic device 610, such as when the electronic device 610 is lifted by the user over the head of the user. Depending on the magnitude of the upward motion as detected by the IMU sensor, the electronic device 610 can determine that the user has difficulty seeing the display. For example, based on the angle, and orientation of the raised electronic device, the user can be prevented from seeing the display.

At step 740 the electronic device 610 can determine a confidence level based on the detected and tracked eyes from step 720, the detected motion of step 730, or both. For example, the electronic device 610 can determine a confidence level with respect to whether to modify a user interface button base on either the tracked eyes from step 720, the detected motion of step 730, or a combination of both. In certain embodiments, the electronic device can assign a two-tiered confidence level based on the tracked eyes of the user or detected motion of the electronic device 610 or both. For example, a two-tiered confidence level can include a high confidence level and a low confidence level. A high confidence level can indicate that the user interface button should be modified, whereas a low confidence level can indicate that the user interface button should not be modified and remain in a default position and with default attributes (color, size shape, and the like). In certain embodiments, the electronic device can assign a three-tiered confidence level based on the tracked eyes of the user or detected motion of the electronic device 610 or both. For example, a three-tiered confidence level can include a high confidence level, a medium conference level, and a low confidence level. The medium confidence level and the low confidence level can correspond to the high and low confidence levels of the two-tiered confidence level, discussed above. For instance, a medium confidence level can indicate that the user interface button should be modified, whereas a low confidence level can indicate that the user interface button should not be modified and remain in a default position and with default attributes (color, size shape, and the like). In the three tired conference level, a high confidence level can indicate that the electronic device 610 should activate the user interface button automatically without modifying the user interface button. The high confidence level can occur when electronic device determines that regardless of modifying the user interface button, the user will be unable to see the display to engage the button. The various confidence levels can be determined based on the state data of the electronic device and received parameters from a neural network. The state data can include data from the eyes of the user as captured by the camera, or movement data as detected by an IMU sensor, or a combination of both.

At step 750, the electronic device 610 performs an action based on the determined confidence level. For example, the electronic device 610 can determine to automatically perform the function of a user interface button as if selected by the user, based on the determined confidence level. In another example, the electronic device 610 can determine to modify a user interface button, based on the determined confidence level. The electronic device 610 can then determine to reposition a user interface button to a new location on the screen. In response to determining to reposition the user interface button, the electronic device identifies a location on the screen to move the user interface button. For example, the electronic device can identify a position of a finger of the user via the camera that was used at step 720 to detect a user finger of the user and move the move user interface button on the screen in proximity to the detected finger. If the camera is in landscape the button can be moved to the right side or the left side of the screen to enable the user to touch the user interface button. The electronic device 610 can also determine to change the shape, color, or size of the user interface button. For example, the user interface button is increased in size in proportion to the magnitude of the vibrations. In another example the user interface button changes color to contrast with the ambient color as detected by the camera. The user interface button can also change color to contrast with the predominate color of the content displayed on the display. Additionally, if the confidence level is determined to be low, the electronic device 610 does not modify any user interface button. In certain embodiments, when the electronic device 610 determines to modify the user interface, the electronic device can trigger an intelligent user interface that determines how to modify the user interface button.

In response to triggering the modified user interface, at step 760 the electronic device 610 monitors whether the user interacts the modified interface, as well as how the user interacts the modified interface. For example, if the electronic device 610 automatically performs the function of a user interface button as if selected by the user, the electronic device monitors whether the user undoes what the electronic device 610 performed within a predetermined time period. Such data is recorded as feedback data. For instance, if the electronic device automatically takes a picture by engaging the shutter button (the modifiable user interface button) and the user deletes the photographed image, such information is maintained as feedback data. Similarly, if the electronic device 610 automatically took a picture by engaging the shutter button and the user did not delete the photographed image, such information is maintained as feedback data. In another example, if the user interface engine 450 determines to modify a user interface button, the feedback data can include whether the user interacted with the user interface button within a predetermined time. For instance, the feedback data can indicate whether the user provided an input with respect to the modified user interface button.

At step 770, the electronic device 610 provides feedback data to the neural network. The feedback data allows the neural network to analyze how the user interacted with the user interface button. The neural network can then weight the feedback data against the trained data, and if necessary modify the neural network parameters. For example, the neural network can compare the results of the user interaction with the electronic device 610 to the trained neural network, and if a discrepancy exists, the neural network can modify the parameters that the electronic device 610 uses when determining the confidence levels.

Figure 8A:
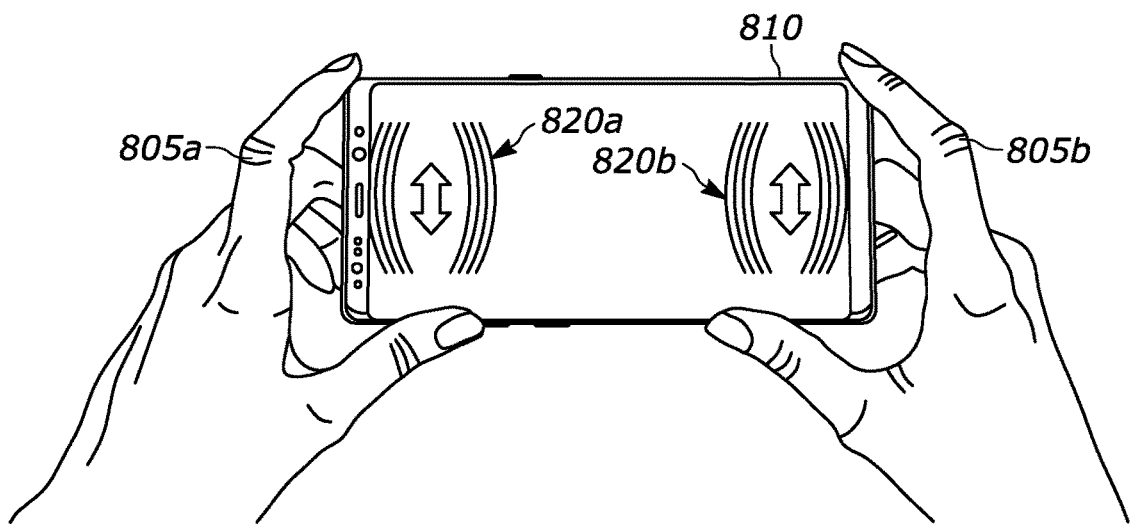
FIGS. 8A and 8B illustrate an example diagrams for modifying a display in accordance with an embodiment of this disclosure.
Figure 8B:
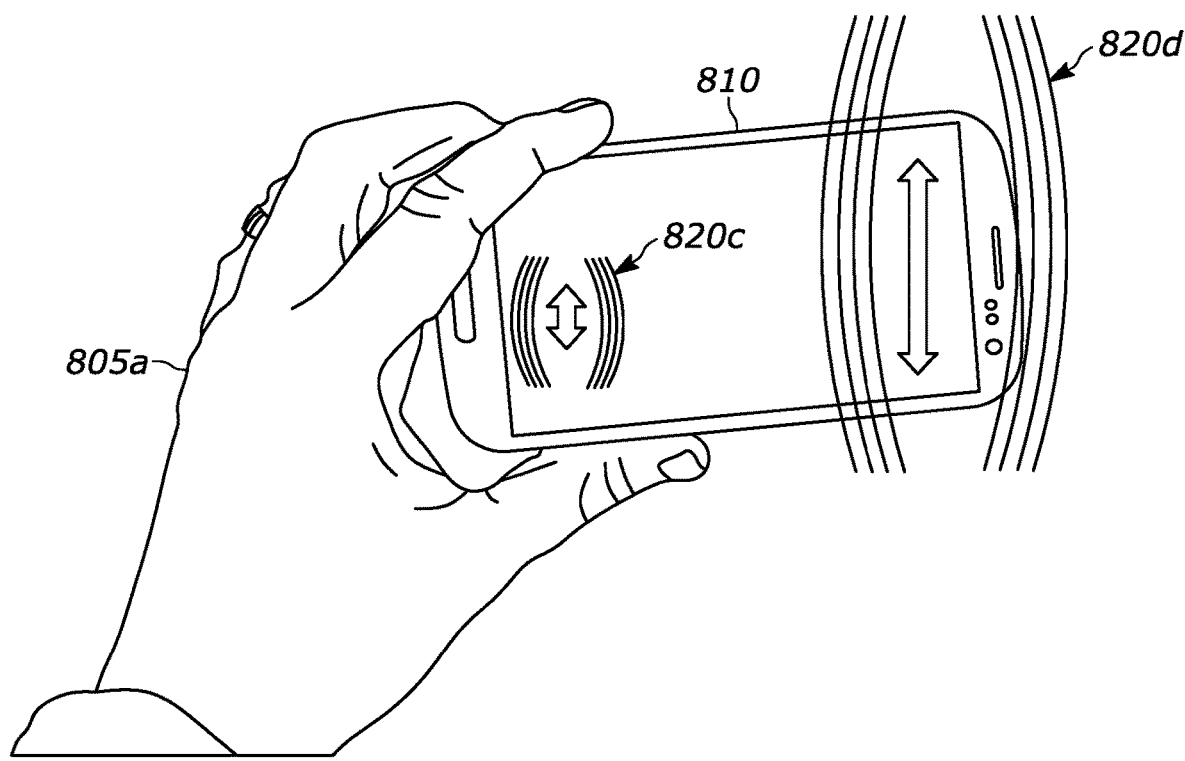

FIGS. 8A and 8B illustrate an example diagrams for modifying a display in accordance with an embodiment of this disclosure. FIGS. 8A and 8B depict electronic device 810. The electronic device 810 is similar to the electronic device 610 of FIGS. 6A, 6B, and 6C, the electronic device 510 of FIG. 5, the electronic device 410 of FIG. 4, any of the client devices 106-114 and can include internal components similar to that of the electronic device 300 of FIG. 3. Vibrations 820a, 820b, 820c, and 820d can be detected by the motion sensor 514 of FIG. 5, the motion sensor 442 of FIG. 4, and the sensor 365 of FIG. 3.

FIGS. 8A and 8B illustrate example diagrams of an electronic device 810 that can detect whether the electronic device 810 is held in one hand of the user or held in two hands of the user. When the electronic device 810 is held in one hand of the user, the user can have difficulty providing an input on a touchscreen of the electronic device 810. For example, if the electronic device 810 is held one handed in landscape the user may not be able to reach a user interface button on the side of the electronic device 810 that the user is not holding.

FIG. 8A illustrates a left hand 805a of a user and a right hand 805b of the user (collectively the "both hands 805" of the user) holding the electronic device 810. IMU sensors detect vibrations 820a and 820b such as minor shaking of the left hand 805a and the right hand 805b of the user. In certain embodiments, the IMU sensors are internal to the electronic device 810. The IMU sensors detect the motions of the electronic device such as whether the electronic device is raised or lowed, as well as whether minor vibrations caused by a user hand shake the electronic device 810, such as vibrations 820a and 820b. Vibration 820a can be caused by the left hand 805a of the user. Similarly, vibration 820b can be caused by the right hand 805b of the user. The vibrations 820a and 820b are depicted as being similar in magnitude. For example, when the vibrations 820a and 820b are approximately the same, the electronic device 810 determines that both hands 805 of the user are holding the electronic device 810. Similarly, when the vibrations 820a and 820b are or within a similar threshold, the electronic device 810 determines that both hands 805 of the user are holding the electronic device 810.

FIG. 8B illustrates the left hand 805a holding the electronic device 810. The vibrations 820c and 820d are detected by the internal IMU sensors. Vibration 820c is similar in magnitude to the vibrations 820a and 820b. Vibration 820c is similar in magnitude to the vibrations 820a and 820b the left hand 805a of the user is holding the left side of the electronic device 810. When the electronic device 810 is held one handed, the side of the electronic device 810, opposite the side being held, can have a larger vibrations as that side is not under the direct control of the user. That is, any handshaking that is transmitted from the left hand 805a of the user to the electronic device 810 increases as the movement moves along the length of the electronic device 810. For example, the magnitude of the upward and downward vibrations of the electronic device 810 will be less on the side of the electronic device 810 that is held by a user. Therefore vibrations 820d will be larger than vibrations 820c, when the electronic device 810 is held by the left hand 805a of the user. Alternatively, vibrations 820c will be larger than vibrations 820d, when the electronic device 810 is held by the right hand 805b of the user. The user interface engine 450 (of FIG. 4) can detect a difference in the magnitude of vibrations between the right and left side of the electronic device 810. If the difference in the vibrations is over a threshold, the user interface engine 450 can determine that the electronic device 810 is held in one hand as well as determine which hand is holding the electronic device 810. The user interface engine 450 can determine that the electronic device 810 is held in one hand in order to determine whether to modify a user interface button based on the amount of vibrations. Additionally, the in order to determine how to modify a user interface button based on the magnitude of detected vibrations. For example, if the user interface engine 450 determines that only the left hand 805a is holding the electronic device 810, then the user interface engine 450 can trigger the user interface button to move to the left side of the display. In another example, if the user interface engine 450 determines that only the right hand 805b is holding the electronic device 810, then the user interface engine 450 can trigger the user interface button to move to the right side of the display.

Figure 9:
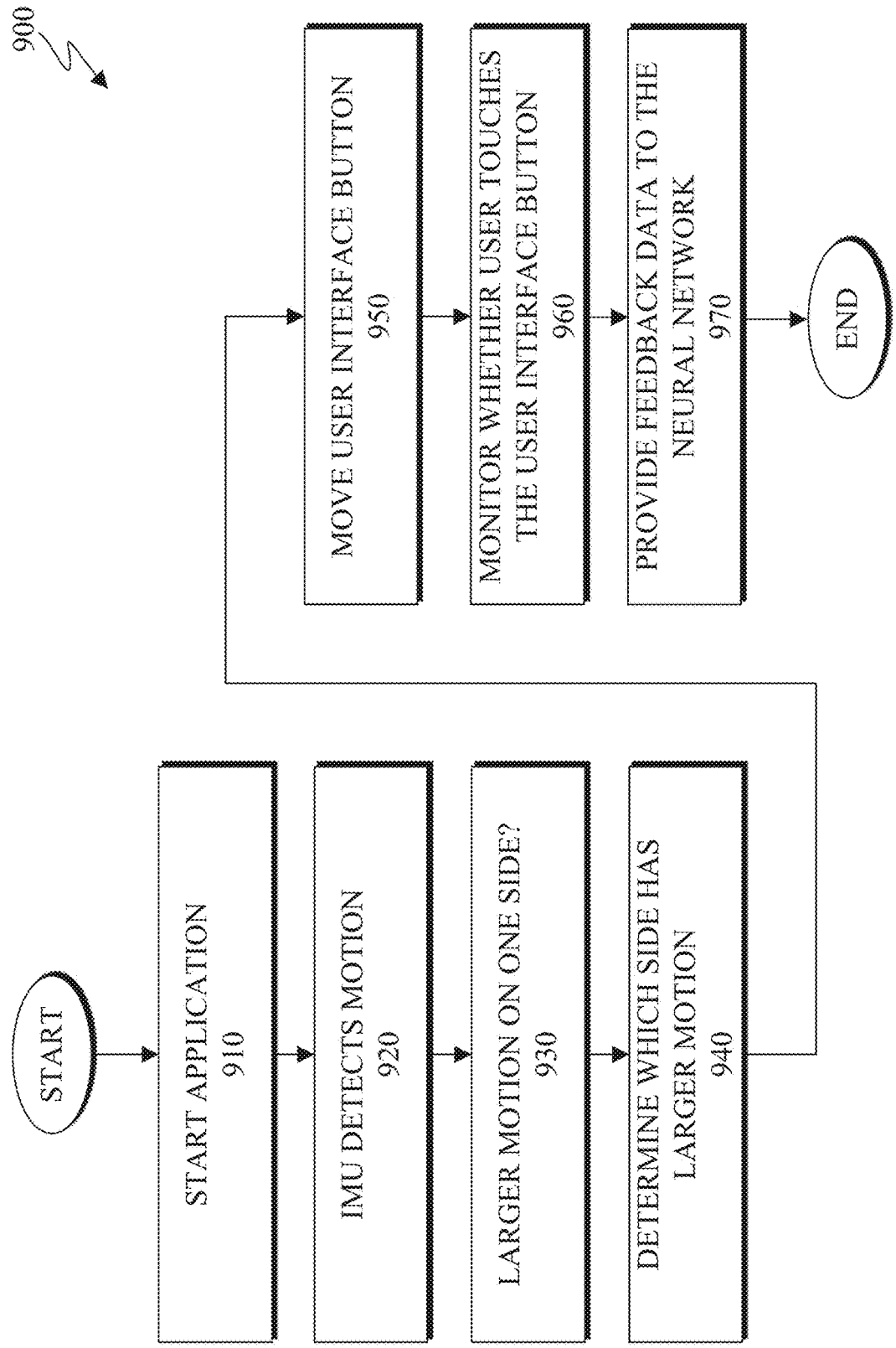
FIG. 9 illustrates an example method for modifying a display in accordance with an embodiment of this disclosure.

FIG. 9 illustrates an example method for modifying a display in accordance with an embodiment of this disclosure. FIG. 9 depicts flowchart 900 for modifying a user interface. The steps of the flowchart 900 can occur in series, in parallel, concurrently, or in an overlapping manner. Additionally, no inference should be drawn from that sequence regarding specific order of performance. In certain embodiments, various steps of the flowchart 900 can be omitted. The flowchart 900 depicts a method that is similar to the diagrams of FIGS. 8A and 6B. The method depicted in FIG. 9 is described as implemented any of the client devices 106-114 of FIG. 1, the electronic device 300 of FIG. 3, the electronic device 410 of FIG. 4, the electronic device 510 of FIG. 5, the electronic device 610 of FIGS. 6A, 6B, and 6C, or the electronic device 810 of FIGS. 8A and 8B.

At step 910, the electronic device 810 starts an application. The application can be started based on a user input, or automatically performed such as in response to the occurrence of an event or received information. The application can include one or more user interface buttons that can be modified. The application can be a camera application, a phone calling application, a video calling application, a game, an email application, a retail application, or the like. For example, the user interface button can be a shutter button of a camera application. In another example, the user interface button can be the hang up button for a phone call or video call. In another example, the user interface button can be the send button for an email or text message. In another example, the user interface button can be the purchase button for a shopping application. In another example, the user interface button can be the search button for a web browser. The application can be any type of application or program accessed on the electronic device 810. The application includes one or more user interface icons that can be modified, such as the ability of the electronic device 810 to relocate or move the position of the user interface button, alter the shape, size, or color of the user interface button, or any combination thereof. In certain embodiments, the application can be the home screen of the electronic device 810, such as the main display that depicts one or more windows or icons that can be selected by the user.

At step 920, an IMU sensor (similar to the sensor 365 of FIG. 3, motion sensor 442 of FIG. 4, and the motion sensor 514 of FIG. 5) detects motion of the electronic device 610. In certain embodiments, the IMU sensor can detect the orientation of the electronic device, such as whether the electronic device is in a portrait orientation or a landscape orientation. Additionally the IMU sensor detects motions on the right side of the electronic device 810 and motions on the left side of the electronic device 810. The motion detected by the IMU sensor can be vibrations caused by the hands of a user shaking or moving. The movements or shaking of the hands that is transferred to the electronic device 810 can be slight involuntary movement that manifests as a slight tremor or slight shaking of the hands of the user. The detected motion is included in the state data of the electronic device 810.

At step 930, the user interface engine 450 of FIG. 4, determines whether the detected vibrations are similar on the left and right side of the electronic device 810 or whether one side of the electronic device 810 has a larger vibration. The user interface engine 450 compares the magnitude of the vibrations detected by the IMU sensor on the left side of the electronic device 810 to the magnitude of the vibrations detected by the IMU sensor on the right side of the electronic device 810, to determine if the vibrations are larger than a threshold on the right or left side of the electronic device 810. If a side of the electronic device 810 has a larger vibration than the other side, then the user interface engine 450 can determine that the electronic device 810 is held in one hand. The determination that one side of the electronic device 810 has larger motion than the other side is included in the state data of the electronic device 810.

If the user interface engine 450 determines that one side of the electronic device 810 has larger vibrations, then at step 940, the user interface engine 450 determines which side of the electronic device 810 has a larger vibration. The side of the electronic device 810 with the smaller vibrations is determined to be the side that the user is holding. Similarly, side of the electronic device 810 with the larger vibrations is determined to be the side that the user is not holding. The determination of which side has a larger motion is included in the state data of the electronic device 810.

At step 950, the user interface engine 450 determines to modify the user interface button. For example, the user interface engine 450 can move the user interface button to the side of the electronic device 810 that is being held by the user. By moving the user interface button to the side of the electronic device 810 that is being held by the user improves the usability of the electronic device 810 by allowing the user to easily reach the user interface button while holding the electronic device 810.

At step 960, the user interface engine 450 monitors whether the user interacts the modified user interface button, after the user interface button is moved. For example, after determining to modify the user interface button, the user interface engine 450 monitors the user interface button for a predetermined period of time to detect whether the user activates the modified user interface button. While the user interface engine 450 monitors the user interface button, feedback data is generated. The feedback data indicate whether the user provided an input with respect to the modified user interface button. For example, the feedback data can indicate that the user activated the modified user input. The feedback data can also indicate that the user did not activate the modified user input within a predetermined period of time.

At step 970, the electronic device 810 provides feedback data to a neural network. The feedback data allows the neural network to analyze how the user interacted with the user interface button. The neural network can then weight the feedback data against the trained datasets, and if necessary modify the neural network parameters as utilized by the electronic device 810. For example, the neural network can compare the results of the user interaction with the electronic device 810 to the trained neural network, and if a discrepancy exists, the neural network can modify the parameters that the electronic device 810 uses when determining the confidence levels.

Figure 10:
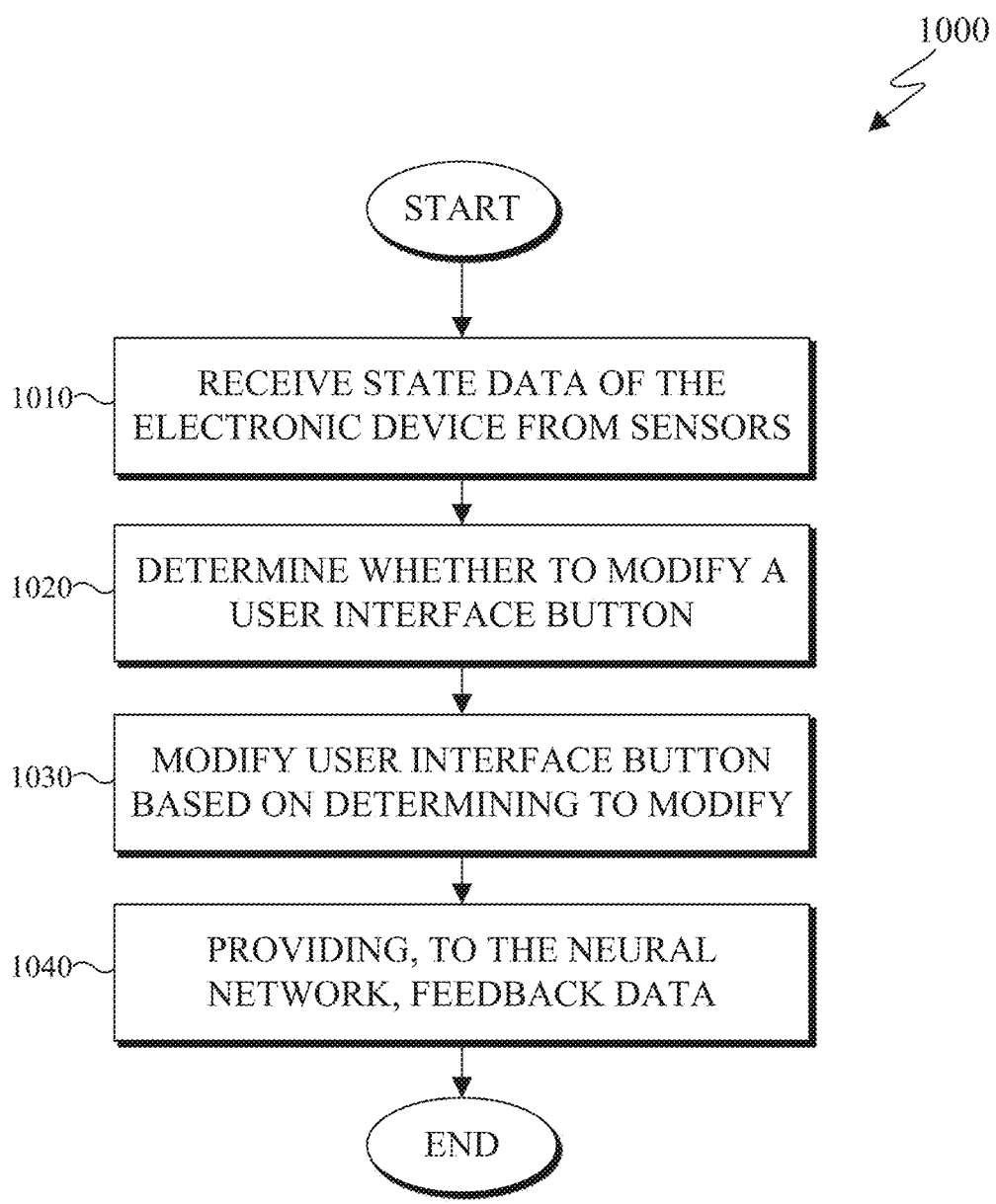
FIG. 10 illustrates an example method for modifying a display in accordance with an embodiment of this disclosure.

FIG. 10 illustrates an example method for modifying a display in accordance with an embodiment of this disclosure. FIG. 10 illustrates flowchart 1000 for operating an electronic device according to this disclosure. For example, the process depicted in FIG. 10 is described as implemented by the electronic device 300 of FIG. 3, the electronic device 410 of FIG. 4, the electronic device 510 of FIG. 5, the electronic device 610 of FIGS. 6A, 6B, and 6C, the electronic device 810 of FIGS. 8A and 8B, or any one of the client devices 106-114 of FIG. 1, and server 104 of FIG. 1.

The process begins with the electronic device, such as electronic device 410 receiving data about a state of the electronic device from one or more sensors of the electronic device (1010). The state data of the electronic device can include motion data from various sensors of the electronic device. In certain embodiments the sensors include camera and motion sensors. In certain embodiments the sensors include a camera. In certain embodiments the sensors include motion sensors. The state data can indicate whether the line of sight of the camera detects a face of the user. Similarly, the state data can indicate whether the user is looking at the display of the electronic device 410 through gaze detection of the user. The state data can also include particular motions associate with the electronic device 410. For example, the state data can indicate if the electronic device 410 was raised above the head of the user. In another example, the state data can indicate if the electronic device is held in one hand or two hands. In another example, the state data can indicate which hand is holding the electronic device 410, after the electronic device 410 determines that only one hand is holding the electronic device 410.

The process then determines whether to modify a user interface button displayed on a display of the electronic device based on the received state data and parameters of a neural network (1020). The neural network parameters are derived from a trained neural network and provide indications as to whether the electronic device 410 should modify a user interface button. The neural network parameters are based on a weighted analysis of input data. In certain embodiments a LSTM neural network weights the various input data and provides the parameters to the electronic device 410. Based on various state data different neural network parameters are invoked when the electronic device 410 determines whether to modify a particular user interface button.

For example, the state data can include images from a camera. The electronic device 410 can detect whether a face of a user leaves a line of sight of the camera of a period of time. If the face of the user leaves the light of sight of the camera, the electronic device 410 determines to modify the user interface button.

In another example, the state data can include data from a motion sensor. The electronic device 410 is able to detect an orientation of the display based on data from the motion sensor. For example, the electronic device 410 can detect whether the display is in a landscape or portrait mode. The electronic device 410 is able to determine whether the electronic device 410 is held in one hand or two. The electronic device 410 can determine whether the electronic device 410 is held in one hand or two based on whether the sensor data motion on one side of the display that is a predetermined threshold larger than the motion on the other side of the display of the electronic device 410. If the electronic device 410 detects motion larger than a threshold on one side of the display compared to the other side of the display, the electronic device 410 determines to modify the user interface button.

In another example, the state data can include data from a motion sensor. The electronic device 410 can detect an upward motion from the motion sensor data. If the upward motion indicates that the electronic device 410 is above the head of the user, then the electronic device 410 determines to modify the user interface button.

In another example, the state data can include data from a motion sensor and a camera. The electronic device 410 can detect whether a face of a user leaves a line of sight of the camera of a period of time and an upward motion from the motion sensor data. If the face of the user leaves the light of sight of the camera and the upward motion indicates that the electronic device 410 is above the head of the user, then the electronic device 410 determines to modify the user interface button.

The neural network parameters indicate whether the electronic device 410 is to modify the user interface button based on the state data of the electronic device. In certain embodiments the neural network parameters indicate multiple confidence levels for the electronic device 410 when determining whether to modify the user interface button. For example, based on the state data the electronic device 410 determines a confidence level from the parameters of the neural network. If the confidence level is above a threshold, then the electronic device 410 triggers the user interface button without modifying user interface button. If the confidence level is at or below a threshold, then the electronic device 410 determines to modify the user interface button on the display. In certain embodiments, the electronic device 410 determines not to modify the user interface button as the state data indicate that the user is not having difficulty to provide an input on the user interface button.

After the process determines to modify a user interface button, the process modifies the display of the user interface button on the display of the electronic device (1030). In certain embodiments, the electronic device 410 moves the user interface button to from a first location on the display to a second location on the display. For example, if the electronic device 410 is held in one hand, the user interface button is modified by moving the user interface button to the side of the electronic device 410 that is held by the user. In another example, if the electronic device is held above the head of the user, the user interface button is modified as the use interface button is moved to a position on the display that is in proximity to a finger of the user as detected by the camera. In certain embodiments, the electronic device 410 modifies a size of the user interface button. For example, the size of the user interface button can increase based on the magnitude of the vibrations. For example, the user interface button is increased in proportion to the magnitude of the vibrations. In certain embodiments, the electronic device

410 modifies a color of the user interface button. In certain embodiments, the electronic device 410 modifies a shape of the user interface button.

Thereafter, the process provides, to the neural network, feedback data indicating whether the user interface button was triggered within a predetermined time period after modifying the user interface button. The feedback data provided to the neural network allows the neural network to analyze how the user interacted with the user interface button. The neural network weighs the results of whether the user interface button was moved, with whether the user activated the user interface button within a predetermined time. The neural network weights the feedback data against the trained datasets, and if necessary modifies and provides updated the neural network parameters as to be utilized by the electronic device 410. The feedback data enables the neural network to remove false positive triggers such as when the electronic device determined to modify a user interface button when the user did not activate the button after the modification.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a display;
   one or more sensors; and
   a processor operably connected to the display and the one or more sensors, wherein the processor is configured to:
   receive data about a state of the electronic device from the one or more sensors of the electronic device, wherein the state data indicates a positional relationship between the electronic device and a user and motion of the electronic device along a specified axis;
   determine whether to modify a user interface button that is displayed on the display of the electronic device based on the received state data and parameters of a neural network;
   in response to determining to modify the user interface button, modify the user interface button on the display of the electronic device based on the parameters of the neural network and the received state data; and
   provide, to the neural network, feedback data indicating whether the user interface button was triggered within a predetermined time period after modifying the user interface button.

2. The electronic device of claim 1, wherein:
   the one or more sensors include a camera,
   the received state data includes images from the camera, and
   to determine whether to modify the user interface button, the processor is further configured to:
   detect, based on the images, whether a face of the user leaves a line of sight of the camera over time; and
   determine whether to modify the user interface button based on detecting the face of the user leaving the line of sight of the camera.

3. The electronic device of claim 1, wherein:
   the one or more sensors include a camera and a motion sensor,
   the received state data includes images from the camera and data from the motion sensor, and
   to determine whether to modify the user interface button, the processor is further configured to:
   detect, based on the images, whether a face of the user leaves a line of sight of the camera over time;
   detect an upward motion of the electronic device based on the motion sensor data; and
   determine whether to modify the user interface button based on detecting the face of the user leaving the line of sight of the camera and detecting the upward motion.

4. The electronic device of claim 1, wherein:
   the one or more sensors include a motion sensor,
   the received state data includes data from the motion sensor, and
   to determine whether to modify the user interface button, the processor is further configured to:
   determine that the display is in a landscape mode based on the motion sensor data;
   in response to determining that the display is in the landscape mode, determine whether the electronic device is being held in one hand based on whether the motion sensor data indicates that the motion on one side of the display is at least a predetermined threshold greater than the motion on another side of the display; and
   determine whether to modify the user interface button based on determining that the electronic device is being held in one hand.

5. The electronic device of claim 4, wherein the processor is further configured to determine a modification of the user interface button based on the motion sensor data,
   wherein, to modify the display of the user interface button, the processor is further configured to:
   in response to determining to modify the user interface button based on determining that the electronic device is being held in one hand, detect whether a first side or a second side of the display is being held based on the motion sensor data indicating the side of the display with less motion, and
   move a location of the user interface button to the side of the display that is being held.

6. The electronic device of claim 1, wherein, to determine whether to modify the user interface button based on the received state data and the parameters of the neural network, the processor is further configured to:
- determine a confidence level from the parameters of the neural network based on the received state data;
- trigger the user interface button when the confidence level is above a threshold; and
- modify the user interface button on the display when the confidence level is below the threshold.

7. The electronic device of claim 1, wherein, to modify the user interface button on the display, the processor is configured to at least one of:
- move the user interface button from a first location on the display to a second location on the display based on the received state data and the parameters of the neural network; and
- modify a size of the user interface button, a color of the user interface button, or a shape of the user interface button based on the received state data and the parameters of the neural network.

8. A method for operating an electronic device, the method comprising:
- receiving data about a state of the electronic device from one or more sensors of the electronic device, wherein the state data indicates a positional relationship between the electronic device and a user and motion of the electronic device along a specified axis;
- determining whether to modify a user interface button that is displayed on a display of the electronic device based on the received state data and parameters of a neural network;
- in response to determining to modify the user interface button, modifying the user interface button on the display of the electronic device based on the parameters of the neural network and the received state data; and
- providing, to the neural network, feedback data indicating whether the user interface button was triggered within a predetermined time period after modifying the user interface button.

9. The method of claim 8, wherein:
- the received state data includes images from a camera, and
- determining whether to modify the user interface button comprises:
  - detecting, based on the images, whether a face of the user leaves a line of sight of the camera over time; and
  - determining whether to modify the user interface button based on detecting the face of the user leaving the line of sight of the camera.

10. The method of claim 8, wherein:
- the received state data includes images from a camera and data from a motion sensor, and
- determining whether to modify the user interface button comprises:
  - detecting, based on the images, whether a face of the user leaves a line of sight of the camera over time;
  - detecting an upward motion of the electronic device based on the motion sensor data; and
  - determining whether to modify the user interface button based on detecting the face of the user leaving the line of sight of the camera and detecting the upward motion.

11. The method of claim 8, wherein:
- the received state data includes data from a motion sensor, and
- determining whether to modify the user interface button comprises:
  - determining that the display is in a landscape mode based on the motion sensor data;
  - in response to determining that the display is in the landscape mode, determining whether the electronic device is being held in one hand based on whether the motion sensor data indicates that the motion on one side of the display is at least a predetermined threshold greater than the motion on another side of the display; and
  - determining whether to modify the user interface button based on determining that the electronic device is being held in one hand.

12. The method of claim 11, further comprising determining a modification of the user interface button based on the motion sensor data,
wherein modifying the display of the user interface button comprises:
- in response to determining to modify the user interface button based on determining that the electronic device is being held in one hand, detecting whether a first side or a second side of the display is being held based on the motion sensor data indicating the side of the display with less motion, and
- moving a location of the user interface button to the side of the display that is being held.

13. The method of claim 8, wherein determining whether to modify the user interface button based on the received state data and the parameters of the neural network comprises:
- determining a confidence level from the parameters of the neural network based on the received state data;
- triggering the user interface button when the confidence level is above a threshold; and
- modifying the user interface button on the display when the confidence level is below the threshold.

14. The method of claim 8, wherein modifying the user interface button on the display comprises at least one of:
- moving the user interface button from a first location on the display to a second location on the display based on the received state data and the parameters of the neural network; and
- modifying a size of the user interface button, a color of the user interface button, or a shape of the user interface button based on the received state data and the parameters of the neural network.

15. A non-transitory computer readable medium embodying a computer program, the computer program comprising computer readable program code that when executed by a processor of an electronic device causes the processor to:
- receive data about a state of the electronic device from one or more sensors of the electronic device, wherein the state data indicates a positional relationship between the electronic device and a user and motion of the electronic device along a specified axis;
- determine whether to modify a user interface button that is displayed on a display of the electronic device based on the received state data and parameters of a neural network;
- in response to determining to modify the user interface button, modify the user interface button on the display of the electronic device based on the parameters of the neural network and the received state data; and
- provide, to the neural network, feedback data indicating whether the user interface button was triggered within a predetermined time period after modifying the user interface button.

16. The non-transitory computer readable medium of claim 15, wherein:
the received state data includes images from a camera, and
the computer readable program code that causes the processor to determine whether to modify the user interface button comprises computer readable program code that, when executed by the processor, causes the processor to:
detect, based on the images, whether a face of the user leaves a line of sight of the camera over time; and
determine whether to modify the user interface button based on detecting the face of the user leaving the line of sight of the camera.

17. The non-transitory computer readable medium of claim 15, wherein:
the received state data includes images from a camera and data from a motion sensor, and
the computer readable program code that causes the processor to determine whether to modify the user interface button comprises computer readable program code that, when executed by the processor, causes the processor to:
detect, based on the images, whether a face of the user leaves a line of sight of the camera over time;
detect an upward motion of the electronic device based on the motion sensor data; and
determine whether to modify the user interface button based on detecting the face of the user leaving the line of sight of the camera and detecting the upward motion.

18. The non-transitory computer readable medium of claim 15, wherein:
the received state data includes data from a motion sensor, and
the computer readable program code that causes the processor to determine whether to modify the user interface button comprises computer readable program code that, when executed by the processor, causes the processor to:
determine that the display is in a landscape mode based on the motion sensor data;
in response to determining that the display is in the landscape mode, determine whether the electronic device is being held in one hand based on whether the motion sensor data indicates that the motion on one side of the display is at least a predetermined threshold greater than the motion on another side of the display; and
determine whether to modify the user interface button based on determining that the electronic device is being held in one hand.

19. The non-transitory computer readable medium of claim 18, wherein the computer program further comprises computer readable program code that, when executed by the processor, causes the processor to determine a modification of the user interface button based on the motion sensor data, and
wherein the computer readable program code that causes the processor to modify the display of the user interface button comprises computer readable program code that, when executed by the processor, causes the processor to:
in response to determining to modify the user interface button based on determining that the electronic device is being held in one hand, detect whether a first side or a second side of the display is being held based on the motion sensor data indicating the side of the display with less motion, and
move a location of the user interface button to the side of the display that is being held.

20. The non-transitory computer readable medium of claim 15, wherein the computer readable program code that causes the processor to determine whether to modify the user interface button based on the received state data and the parameters of the neural network comprises computer readable program code that, when executed by the processor, causes the processor to:
determine a confidence level from the parameters of the neural network based on the received state data;
trigger the user interface button when the confidence level is above a threshold; and
modify the user interface button on the display when the confidence level is below the threshold.

* * * * *